(12) United States Patent
Oono

(10) Patent No.: US 10,191,459 B2
(45) Date of Patent: Jan. 29, 2019

(54) CONTROL DEVICE OF ELECTRICAL APPARATUS AND ENERGY MANAGEMENT SYSTEM

(71) Applicant: TOYOTA JIDOSHA KABUSHIKI KAISHA, Toyota-shi, Aichi-ken (JP)

(72) Inventor: Tomoya Oono, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 275 days.

(21) Appl. No.: 15/063,788

(22) Filed: Mar. 8, 2016

(65) Prior Publication Data

US 2016/0266561 A1    Sep. 15, 2016

(30) Foreign Application Priority Data

Mar. 11, 2015   (JP) ................... 2015-048593

(51) Int. Cl.
*H02J 7/02*     (2016.01)
*G05B 19/042*   (2006.01)
(Continued)

(52) U.S. Cl.
CPC ........ *G05B 19/042* (2013.01); *B60L 11/1842* (2013.01); *B60L 11/1844* (2013.01); *G06Q 30/0234* (2013.01); *G06Q 50/06* (2013.01); *H02J 3/14* (2013.01); *G05B 2219/2639* (2013.01); *H02J 2003/143* (2013.01);
(Continued)

(58) Field of Classification Search
CPC ... Y02T 90/128; Y02T 90/163; Y02T 90/167; Y04S 20/222
See application file for complete search history.

(56) References Cited

U.S. PATENT DOCUMENTS

2013/0015708 A1   1/2013   Ukita et al.
2014/0025220 A1   1/2014   Carlson et al.
(Continued)

FOREIGN PATENT DOCUMENTS

JP   2012-070623 A   4/2012
JP   2013-099078 A   5/2013
(Continued)

OTHER PUBLICATIONS

Oct. 31, 2018 Dual Language Office Action issued in Indian Patent Application No. 201614007930.

*Primary Examiner* — Thomas L Dickey
(74) *Attorney, Agent, or Firm* — Oliff PLC

(57) ABSTRACT

A control device of an electrical apparatus configured to receive power from a facility that receives a supply of power from a system power supply, the facility including an energy management system that manages a power feeding schedule according to a first management function provided for managing the power feeding schedule for feeding power to the electrical apparatus, the control device includes an electronic control unit configured to: communicate with the energy management system; manage the power feeding schedule according to a second management function provided for managing the power feeding schedule in the control device; and determine whether the electronic control unit or the energy management system of the facility, will manage the power feeding schedule by comparing the first management function of the energy management system and the second management function of the control device.

16 Claims, 11 Drawing Sheets

| NAME | DEMAND RESPONSE METHOD | | | | |
|---|---|---|---|---|---|
| | RATE BASED | | | INCENTIVE BASED | |
| | TOU TIME OF USE | CPP CRITICAL PEAK PRICING | RTP REAL TIME PRICING | PTR PEAK TIME REBATE | DLC DIRECT LOAD CONTROL |
| OUTLINE | TIME-BASED RATE TABLE IS PREPARED IN ADVANCE | RATE IS SET SIGNIFICANTLY HIGHER WHEN POWER SUPPLY IS CRITICAL | RATE IS CHANGED IN REAL TIME ACCORDING TO DEMAND CHARACTERISTICS | CONSUMER IS REQUESTED TO REDUCE LOAD WHEN POWER SUPPLY IS CRITICAL ⇒ GIVE INCENTIVE TO CONSUMER WHO TAKES ACTION TO REDUCE LOAD | CONTRACTED CONSUMER IS FORCED TO REDUCE LOAD WHEN POWER SUPPLY IS CRITICAL ⇒ GIVE INCENTIVE TO CONSUMER AT CONTRACT TIME |
| IMAGE | YEN/kWh | YEN/kWh | YEN/kWh | YEN/kWh (GIVE INCENTIVE IF LOAD IS REDUCED) | YEN/kWh (REDUCE LOAD IN EXCHANGE FOR INCENTIVE) |

(51) Int. Cl.
    *B60L 11/18*     (2006.01)
    *G06Q 50/06*     (2012.01)
    *H02J 3/14*      (2006.01)
    *G06Q 30/02*     (2012.01)

(52) U.S. Cl.
    CPC ....... *Y02B 70/3225* (2013.01); *Y02B 70/3266* (2013.01); *Y04S 20/222* (2013.01); *Y04S 20/242* (2013.01); *Y04S 50/14* (2013.01)

(56)                References Cited

U.S. PATENT DOCUMENTS

2014/0288718 A1    9/2014    Nishibayashi et al.
2015/0042288 A1    2/2015    Ishii et al.

FOREIGN PATENT DOCUMENTS

| NAME | DEMAND RESPONSE METHOD | | | | |
|---|---|---|---|---|---|
| | RATE BASED | | | INCENTIVE BASED | |
| | TOU<br>TIME OF USE | CPP<br>CRITICAL PEAK PRICING | RTP<br>REAL TIME PRICING | PTR<br>PEAK TIME REBATE | DLC<br>DIRECT LOAD CONTROL |
| OUTLINE | TIME-BASED RATE TABLE IS PREPARED IN ADVANCE | RATE IS SET SIGNIFICANTLY HIGHER WHEN POWER SUPPLY IS CRITICAL | RATE IS CHANGED IN REAL TIME ACCORDING TO DEMAND CHARACTERISTICS | CONSUMER IS REQUESTED TO REDUCE LOAD WHEN POWER SUPPLY IS CRITICAL<br>⇒ GIVE INCENTIVE TO CONSUMER WHO TAKES ACTION TO REDUCE LOAD | CONTRACTED CONSUMER IS FORCED TO REDUCE LOAD WHEN POWER SUPPLY IS CRITICAL<br>⇒ GIVE INCENTIVE TO CONSUMER AT CONTRACT TIME |
| IMAGE | YEN/kWh ... TIME | YEN/kWh ... TIME | YEN/kWh ... TIME | YEN/kWh ... TIME<br>(GIVE INCENTIVE IF LOAD IS REDUCED) | YEN/kWh ... TIME<br>(REDUCE LOAD IN EXCHANGE FOR INCENTIVE) |

CONTROL DEVICE OF ELECTRICAL APPARATUS AND ENERGY MANAGEMENT SYSTEM

INCORPORATION BY REFERENCE

The disclosure of Japanese Patent Application No. 2015-048593 filed on Mar. 11, 2015 including the specification, drawings and abstract is incorporated herein by reference in its entirety.

BACKGROUND

1. Technical Field

The disclosure relates to a control device of an electrical apparatus and to an energy management system, and more particularly to a control device of an electrical apparatus, configured to be able to receive power from a house or a building that receives the supply of power from a system power supply and to an energy management system that manages power feeding to such an electrical apparatus.

2. Description of Related Art

Japanese Patent Application Publication No. 2012-70623 (JP 2012-70623 A) discloses a control device of a vehicle configured to be able to charge a vehicle-mounted power storage device using power supplied from a power supply external to the vehicle. If a charge reservation time is entered via a user operation, this control device starts charging the power storage device according to the entered reservation time. If a charge reservation time is not entered, the control device controls a charging circuit so that the charging of the power storage device is started according to history data on the charging of the power storage device. This control device can be used to adjust the charging schedule for the power storage device using a power supply outside a vehicle.

Recently, as a system for use in a house or a building (hereinafter simply called a "house"), attention has been paid to the Home Energy Management System (HEMS) that can integrally monitor, and control, power feeding to an electrical apparatus (for example, power feeding to an air conditioner or an electric car) capable of receiving power from the power system.

HEMS also manages the schedule of power feeding to the electrical apparatus (power feeding start/stop, power feeding amount, power feeding time, and so on). However, if an electrical apparatus (vehicle) also has the charging schedule management function as described in Japanese Patent Application Publication No. 2012-70623 (JP 2012-70623 A), there may be interference between the schedule management function of the electrical apparatus and the schedule management function of HEMS.

SUMMARY

The disclosed embodiments provide a control device of an electrical apparatus that is configured to receive power from a house or a building, wherein, when the electrical apparatus has the schedule management function, the control device of the electrical apparatus prevents interference with the schedule management function of HEMS to appropriately manage power feeding to the electrical apparatus.

The disclosed embodiments also provide an energy management system that is provided in a house or a building, wherein the energy management system prevents interference with the schedule management function of an electrical apparatus, which receives power from the house or the building, to appropriately manage power feeding to the electrical apparatus.

According to one aspect, the control device is of an electrical apparatus configured to receive power from a facility that receives a supply of power from a system power supply. The facility includes an energy management system (HEMS) that manages a power feeding schedule according to a first management function provided for managing the power feeding schedule for feeding power to the electrical apparatus. The control device includes an electronic control unit that is configured to function as a communication unit, a schedule management unit, and a control unit. The communication unit communicates with the HEMS. The schedule management unit manages the power feeding schedule according to a second management function provided for managing the power feeding schedule in the control device. The control unit determines whether the schedule management unit or the HEMS of the facility, will manage the power feeding schedule by comparing the first management function of the HEMS and the second management function of the control device.

In this control device, it is determined whether the control device of the electrical apparatus will manage the power feeding schedule or the HEMS of the facility will manage the power feeding schedule by comparing the first management function of the HEMS and the second management function of the electrical apparatus. Therefore, this control device prevents interference between the schedule management function of the electrical apparatus and the schedule management function of the HEMS, thus appropriately managing power feeding to the electrical apparatus.

The "facility" includes a house, a building, and a factory. The HEMS is installed in a house, a building, and a factory. The "electrical apparatus" includes an electric vehicle (hybrid vehicle, electric car, and so on), the battery of which can be charged by a power supply external to the vehicle, and an air conditioner.

Preferably, if a user participates in an incentive system for implementing incentive-based demand response, the control unit may determine that the HEMS will manage the power feeding schedule if the first management function supports, and if the second management function does not support, the incentive-based demand response. The control unit may determine that the schedule management unit will manage the power feeding schedule if the first management function does not support, and if the second management function supports, the incentive-based demand response. The control unit may determine that either the schedule management unit or the HEMS will manage the power feeding schedule, based on whether the first management function and the second management function support rate-based demand response, if both or neither of the first management function and second management function supports the incentive-based demand response.

Preferably, the incentive-based demand response may include a Direct Load Control (DLC) program and a Peak Time Rebate (PTR) program. In the DLC program, a user may be forced to reduce a load for reducing power according to the incentive system. In the PTR program, a user may be requested to reduce power according to the incentive system. If a user participates in the incentive system, the control unit may determine that the HEMS will manage the power feeding schedule if the first management function supports, and if the second management function does not support, the DLC program. The control unit may determine that the schedule management unit will manage the power feeding schedule if the first management function does not support, and if the second management function supports, the DLC program. The control unit may determine that the HEMS will manage the power feeding schedule if both or neither of the first management function and the second management function supports the DLC program and if the first management function supports, and if the second management function does not support, the PTR program. The control unit may determine that the schedule management unit will manage the power feeding schedule if both or neither of the first management function and the second management function supports the DLC program and if the first management function does not support, and if the second management function supports, the PTR program. The control unit may determine that the schedule management unit will manage the power feeding schedule if both or neither of the first management function and the second management function supports the PTR program.

Preferably, if a user participates in the incentive system and if both or neither of the first management function and the second management function supports the incentive-based demand response, the control unit may determine that the HEMS will manage the power feeding schedule if the first management function supports, and if the second management function does not support, rate-based demand response. The control unit may determine that the schedule management unit will manage the power feeding schedule if the first management function does not support, and if the second management function supports, the rate-based demand response. The control unit may determine that the schedule management unit will manage the power feeding schedule if both or neither of the first management function and second management function supports the rate-based demand response.

Preferably, if a user does not participate in an incentive system for implementing incentive-based demand response, the control unit may determine that HEMS will manage the power feeding schedule if the first management function supports, and if the second management function does not support, rate-based demand response. The control unit may determine that the schedule management unit will manage the power feeding schedule if the first management function does not support, and if the second management function supports, the rate-based demand response. The control unit may determine that the schedule management unit will manage the power feeding schedule if both or neither of the first management function and second management function supports the rate-based demand response.

Preferably, the rate-based demand response may include a Real Time Pricing (RTP) program, a Time Of Use (TOU) program, and a Critical Peak Pricing (CPP) program. In the RTP program, a rate may change in real time according to a demand for power. In the TOU program, a rate may be set in advance on a time zone basis. In the CPP program, a rate may rise at a power-demand peak time. If a user participates in the incentive system and if both or neither of the first management function and second management function supports the incentive-based demand response or if a user does not participate in the incentive system, the control unit may determine that the HEMS will manage the power feeding schedule if the first management function supports, and if the second management function does not support, the RTP program. The control unit may determine that the schedule management unit will manage the power feeding schedule if the first management function does not support, and if the second management function supports, the RTP program. The control unit may determine that the HEMS will manage the power feeding schedule if both or neither of the first management function and second management function supports the RTP program and if the first management function supports, and if the second management function does not support, the TOU program. The control unit may determine that the schedule management unit will manage the power feeding schedule if both or neither of the first management function and second management function supports the RTP program and if the first management function does not support, and if the second management function supports, the TOU program. The control unit may determine that the HEMS will manage the power feeding schedule if both or neither of the first management function and second management function supports the TOU program and if the first management function supports, and if the second management function does not support, the CPP program. The control unit may determine that the schedule management unit will manage the power feeding schedule if both or neither of the first management function and second management function supports the TOU program and if the first management function does not support, and if the second management function supports, the CPP program. The control unit may determine that the schedule management unit will manage the power feeding schedule if both or neither of the first management function and second management function supports the CPP program.

Preferably, the control unit may determine that the HEMS will manage the power feeding schedule if the HEMS has, and if the control device does not have, setting information on the power feeding schedule that is set by a user. The control unit may determine that the schedule management unit will manage the power feeding schedule if the control device has, and if the HEMS does not have, the setting information.

Preferably, if both or neither of the HEMS and the control device has the setting information, the control unit may determine that the HEMS will manage the power feeding schedule if the first management function includes, and if the second management function does not include, a prediction function to predict a user behavior. The control unit may determine that the schedule management unit will manage the power feeding schedule if the first management function does not include, and if the second management function includes, the prediction function.

Preferably, the electrical apparatus may be a vehicle configured to receive power from the facility to be able to charge a vehicle-mounted charge storage device (for example, a battery).

According to another aspect, the energy management system is an energy management system (HEMS) provided in a facility that receives a supply of power from a system power supply and is configured to manage feeding of power to an electrical apparatus that is configured to receive power from the facility. The electrical apparatus is configured to manage a power feeding schedule according to a first management function provided for managing in the electrical apparatus the power feeding schedule for feeding power from the facility to the electrical apparatus. The HEMS includes a processor that functions as a communication unit, a schedule management unit, and a control unit. The communication unit communicates with the electrical apparatus. The schedule management unit manages the power feeding schedule according to a second management function provided for managing the power feeding schedule. The control unit determines whether the schedule management unit (of the HEMS) or the electrical apparatus, will manage the power feeding schedule by comparing the first management function of the electrical apparatus and the second management function of the HEMS.

In this energy management system (HEMS), it is determined whether the electrical apparatus will manage the power feeding schedule or the HEMS will manage the power feeding schedule by comparing the first management function of the electrical apparatus and the second management function of the HEMS. Therefore, this HEMS prevents interference between the schedule management function of the electrical apparatus and the schedule management function of the HEMS, thus appropriately managing power feeding to the electrical apparatus.

Preferably, if a user participates in an incentive system for implementing incentive-based demand response, the control unit may determine that the electrical apparatus will manage the power feeding schedule if the first management function supports, and if the second management function does not support, the incentive-based demand response. The control unit may determine that the schedule management unit will manage the power feeding schedule if the first management function does not support, and if the second management function supports, the incentive-based demand response. The control unit may determine that either the schedule management unit or the electrical apparatus will manage the power feeding schedule, based on whether the first management function and the second management function support rate-based demand response, if both or neither of the first management function and second management function supports the incentive-based demand response.

Preferably, the incentive-based demand response may include a Direct Load Control (DLC) program and a Peak Time Rebate (PTR) program. In the DLC program, a user may be forced to reduce a load for reducing power according to the incentive system. In the PTR program, a user may be requested to reduce power according to the incentive system. If a user participates in the incentive system, the control unit may determine that the electrical apparatus will manage the power feeding schedule if the first management function supports, and if the second management function does not support, the DLC program. The control unit may determine that the schedule management unit will manage the power feeding schedule if the first management function does not support, and if the second management function supports, the DLC program. The control unit may determine that the electrical apparatus will manage the power feeding schedule if both or neither of the first management function and the second management function supports the DLC program and if the first management function supports, and if the second management function does not support, the PTR program. The control unit may determine that the schedule management unit will manage the power feeding schedule if both or neither of the first management function and the second management function supports the DLC program and if the first management function does not support, and if the second management function supports, the PTR program. The control unit may determine that the electrical apparatus will manage the power feeding schedule if both or neither of the first management function and the second management function supports the PTR program.

Preferably, if a user participates in the incentive system and if both or neither of the first management function and the second management function supports the incentive-based demand response, the control unit may determine that the electrical apparatus will manage the power feeding schedule if the first management function supports, and if the second management function does not support, rate-based demand response. The control unit may determine that the schedule management unit will manage the power feeding schedule if the first management function does not support, and if the second management function supports, the rate-based demand response. The control unit may determine that the electrical apparatus will manage the power feeding schedule if both or neither of the first management function and second management function supports the rate-based demand response.

Preferably, if a user does not participate in an incentive system for implementing incentive-based demand response, the control unit may determine that the electrical apparatus will manage the power feeding schedule if the first management function supports, and if the second management function does not support, rate-based demand response. The control unit may determine that the schedule management unit will manage the power feeding schedule if the first management function does not support, and if the second management function supports, the rate-based demand response. The control unit may determine that the electrical apparatus will manage the power feeding schedule if both or neither of the first management function and second management function supports the rate-based demand response.

Preferably, the rate-based demand response may include a Real Time Pricing (RTP) program, a Time Of Use (TOU) program, and a Critical Peak Pricing (CPP) program. In the RTP program, a rate may change in real time according to a demand for power. In the TOU program, a rate may be set in advance on a time zone basis. In the CPP program, a rate may rise at a power-demand peak time. If a user participates in the incentive system and if both or neither of the first management function and second management function supports the incentive-based demand response or if a user does not participate in the incentive system, the control unit may deter mine that the electrical apparatus will manage the power feeding schedule if the first management function supports, and if the second management function does not support, the RTP program. The control unit may determine that the schedule management unit will manage the power feeding schedule if the first management function does not support, and if the second management function supports, the RTP program. The control unit may determine that the electrical apparatus will manage the power feeding schedule if both or neither of the first management function and second management function supports the RTP program and if the first management function supports, and if the second management function does not support, the TOU program. The control unit may determine that the schedule management unit will manage the power feeding schedule if both or neither of the first management function and second management function supports the RTP program and if the first management function does not support, and if the second management function supports, the TOU program. The control unit may determine that the electrical apparatus will manage the power feeding schedule if both or neither of the first management function and second management function supports the TOU program and if the first management function supports, and if the second management function does not support, the CPP program. The control unit may determine that the schedule management unit will manage the power feeding schedule if both or neither of the first management function and second management function supports the TOU program and if the first management function does not support, and if the second management function supports, the CPP program. In addition, the control unit may determine that the electrical apparatus will manage the power feeding schedule if both or neither of the first management function and second management function supports the CPP program.

Preferably, the control unit may determine that the schedule management unit will manage the power feeding schedule if the HEMS has, and if the electrical apparatus does not have, setting information on the power feeding schedule that is set by a user. The control unit may determine that the electrical apparatus will manage the power feeding schedule if the electrical apparatus has, and if the HEMS does not have, the setting information.

Preferably, if both or neither of the HEMS and the electrical apparatus has the setting information, the control unit may determine that the electrical apparatus will manage the power feeding schedule if the first management function includes, and if the second management function does not include, a prediction function to predict a user behavior. The control unit may determine that the schedule management unit will manage the power feeding schedule if the first management function does not include, and if the second management function includes, the prediction function.

Preferably, the electrical apparatus may be a vehicle configured to receive power from the facility to be able to charge a vehicle-mounted charge storage device (for example, a battery).

According to the aspects described above, interference between the schedule management function of an electrical apparatus that receives power from a house or a building and the schedule management function of HEMS is prevented to appropriately manage power feeding to the electrical apparatus.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 2 is a diagram showing demand response methods;

DETAILED DESCRIPTION OF EMBODIMENTS

Figure 1:
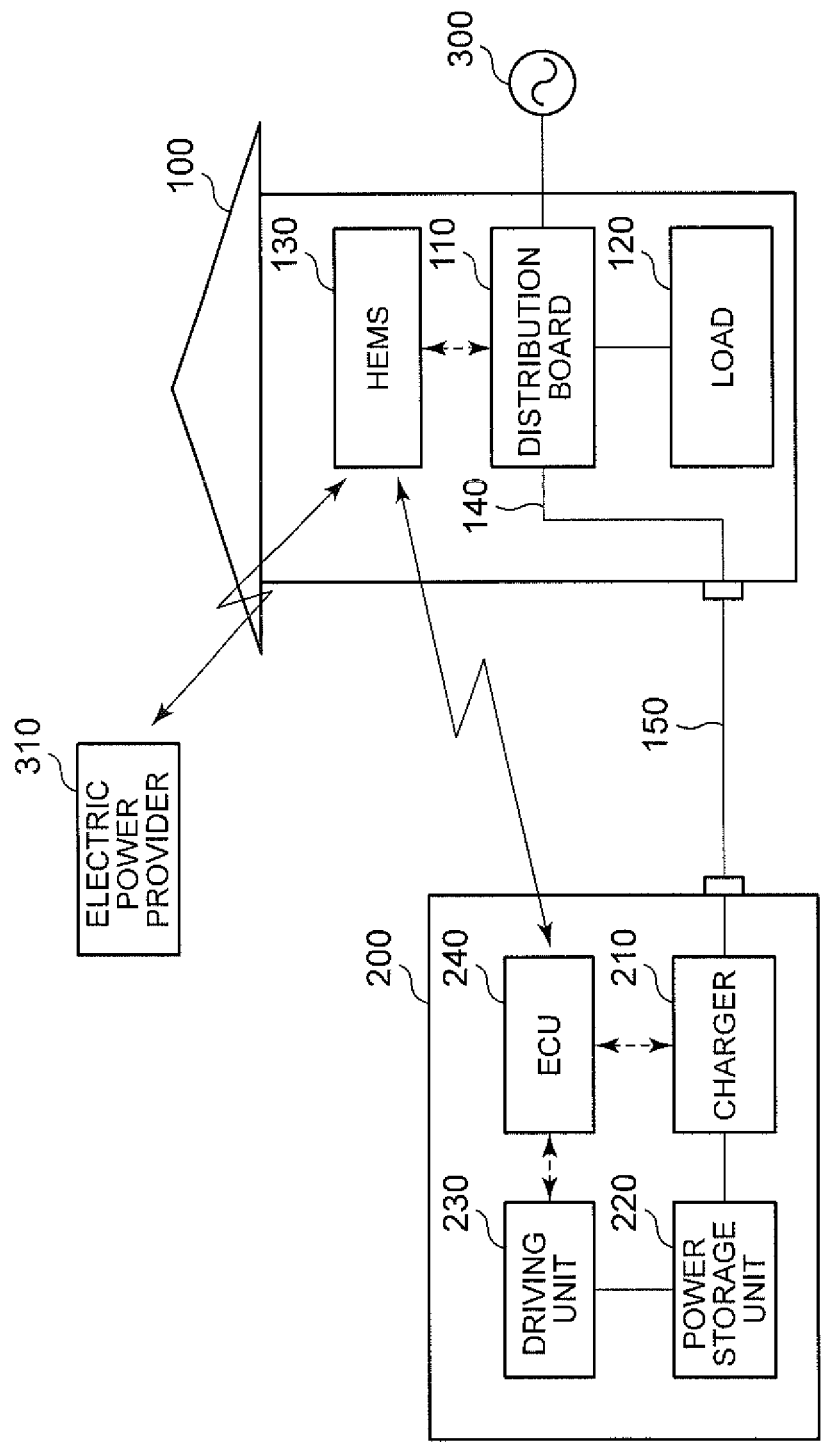
FIG. 1 is a general block diagram showing a power supply system to which a control device of an electrical apparatus in a first embodiment is applied.

Exemplary embodiments are described in detail below with reference to the drawings. Although a plurality of embodiments is described below, it has been intended since the filing of the subject application that the configurations described in the embodiments are combined as necessary. In the description below, the same reference numerals are used for the same or equivalent components and the duplicated description is not repeated.

General Configuration of the System [First embodiment]
FIG. 1 is a general block diagram showing a power supply system to which a control device of an electrical apparatus in a first embodiment is applied. Referring to FIG. 1, the power supply system includes a house 100, a vehicle 200 that is an example of the electrical apparatus described above, and a system power supply 300.

The house 100 is a facility that receives a supply of power from the system power supply 300. The vehicle 200 is an electrical apparatus that can receive power from the house 100. Although represented by the house 100 in the first embodiment and the subsequent embodiments, the facility is not limited to the house 100 but may be any other facility such as a building or a factory. In addition, although represented by the vehicle. 200 in the first embodiment and the subsequent embodiments, the electrical apparatus is not limited to the vehicle 200. For example, the electrical apparatus may be an electrical apparatus that configures a home automation (HA) system such as an air conditioning integrated management system or a hot-water supply system or may be an electrical apparatus that conforms to a communication standard such as ECHONET (registered trademark) or ECHONETLite (registered trademark).

The house 100 includes a distribution board 110, a load 120, HEMS 130, and a power line 140. The distribution board 110 is a device that supplies power, supplied from the system power supply 300, to the load 120 in the house 100 or to the vehicle 200 electrically connected to the power line 140 via a power cable 150. The distribution board 110 has a power sensor (not shown) that measures each of the power received from the system power supply 300 and the power fed to the load 120 and the vehicle 200. The measured value of each power is output to the HEMS 130.

The distribution board 110 has a control switch (not shown) that is controlled by the HEMS 130 for feeding or interrupting power to the load 120 and the vehicle 200. That is, the distribution board 110 is controlled by the HEMS 130 to control the feeding and interruption of power to the load 120 and the vehicle 200. The distribution board 110 may also have a breaker that can interrupt the reception of power from the system power supply 300. The load 120 generically indicates various electric loads (such as an air conditioner) in the house 100.

The HEMS 130 monitors the power feeding from the system power supply 300 to the load 120 and the vehicle 200 and displays, in real time, the amounts of power feeding to the load 120 and vehicle 200. In addition, the HEMS 130 controls the power feeding from system power supply 300 to the load 120 and the vehicle 200. For example, the HEMS 130 can communicate with an electric power provider 310 that manages the system power supply 300 and, from the electric power provider 310, receive the information on "demand response" provided by the electric power provider 310. Based on the received information, the HEMS 130 can manage the schedule of power feeding (power feeding start/stop, power feeding amount, power feeding time, and so on) to the load 120 and the vehicle 200. The HEMS 130 includes a micro-computer having, for example, a central processing unit (CPU or processor), ROM and RAM.

Demand response refers, in general, to a mechanism by which a consumer of electricity changes the demand amount to keep supply and demand for electricity in balance. Demand response is provided to reduce the load based on a contract with the electric power provider 310 or to allow a consumer to adjust the demand amount based on the electricity rate system provided by the electric power provider 310.

As will be described later, the vehicle 200 also has its own charging schedule management function based on demand response, meaning that there may be interference between the schedule management function of the HEMS 130 and the schedule management function of the vehicle 200. In the first embodiment, the HEMS 130 and the vehicle 200 are configured so that they can communicate with each other, and the vehicle 200 compares these two schedule management functions to prevent interference between schedule management by these two functions. Demand response and the above-described control of the vehicle 200 will be described later in detail.

Communication between the HEMS 130 and the vehicle 200 may be carried out by power line communication (PLC) via the power line 140 and the power cable 150 or by wireless communication.

The vehicle 200 includes a charger 210, a power storage unit 220, a driving unit 230, and an electronic control unit (hereinafter called an ECU) 240. The charger 210, controlled by the ECU 240, converts the voltage level of the power, received from the house 100 via the power cable 150, to the voltage level of the power storage unit 220 and outputs the converted power to the power storage unit 220. The charger 210 is configured by a rectifier, an inverter, and so on. The charger 210 may also be configured so that the power can be converted in two directions to allow the power, stored in the power storage unit 220, to be supplied to the house 100 via the power cable 150. The method of receiving power from the house 100 is not limited to the so-called "plug-in", method that uses the power cable 150; instead of this method, the power output from a power transmission coil on the house 100 side may be received by a power reception coil in a non-contact power transmission mode.

The power storage unit 220 can store the power, received from the charger 210, and supply the stored power to the driving unit 230. The power storage unit 220 is configured by a secondary battery, such as a nickel-hydrogen battery or a lithium-ion battery, an electric double layer capacitor, and so on. The power storage unit 220 can also store the power regenerated by the driving unit 230 when the vehicle applies the brake during traveling.

The driving unit 230 generates driving power for driving the driving wheels (not shown) to cause the vehicle 200 to travel. Although not shown in the figure, a converter and an inverter, which receive a supply of power from the power storage unit 220, and a motor, which is driven by the inverter to drive the driving wheels, are included in the driving unit 230. The driving unit 230 may include a generator for generating power for charging the power storage unit 220 as well as an internal combustion engine capable of driving that generator.

The ECU 240, which includes a central processing unit (CPU), a memory, an input/output buffer, and so on (none shown), performs various types of control in the vehicle 200. A representative example is that, when the ignition key (or switch) is turned on to request the start of the traveling system that includes the driving unit 230, the ECU 240 controls the driving unit 230 to control the traveling of the vehicle 200.

In addition, when a request to charge the power storage unit 220 from the house 100 (system power supply 300) is received, the ECU 240 drives the charger 210 to perform charging control for charging the power storage unit 220. In addition, the ECU 240, which is capable of communicating with the electric power provider 310 via the HEMS 130, receives the information on demand response from the electric power provider 310. The ECU 240 may as well communicate directly with the electric power provider 310. Based on the received information on demand response, the ECU 240 can manage the schedule of charging the power storage unit 220 (charging start/stop, charging power, charging time, and so on) from the house 100 (system power supply 300). Demand response is described below.

(Description of demand response) FIG. 2 is a diagram showing demand response methods. Although the demand response methods are not limited to those shown in FIG. 2, it is assumed in the first embodiment and the subsequent embodiments that the five methods described below are provided by the electric power provider 310.

Referring to FIG. 2, the demand response methods are divided roughly into two: rate-based demand response and incentive-based demand response. The rate-based demand response is a system in which the electric power provider informs a consumer about the power rates, such as a time-based rate, to encourage the consumer to reduce demand when the power supply is critical. The incentive-based demand response is a system in which a consumer can receive an incentive by reducing the load according to the contract between the electric power provider and the consumer (user).

The rate-based method includes the Time Of Use (TOU) program, Critical Peak Pricing (CPP) program, and Real Time Pricing (RTP) program. The TOU program is a program in which, with a time-based rate table prepared in advance, the pricing during a power-demand peak time zone is set higher than the pricing during an off-peak time zone to encourage a consumer to reduce the power demand during the power-demand peak time zone. The CPP program is a program in which the rate is set significantly higher when the power supply is critical to encourage a consumer to reduce the demand at power-demand peak time. The RTP program is a program in which the rate is changed in real time according to the demand characteristics to smooth the demand according to the demand characteristics.

The incentive-based method includes the Peak Time Rebate (PTR) program and the Direct Load Control (DLC) program. The PTR program is a program in which, according to the contract between the electric power provider and a consumer, the consumer is requested to reduce the load when the power supply is critical and a consumer, who takes an action to reduce the load, is given an incentive. The DLC program is a program in which, according to the contract between the electric power provider and a consumer, the consumer is forced to reduce or interrupt the load when the power supply is critical and the consumer is given an incentive when the contract is made.

Referring to FIG. 1 again, the ECU 240 has the schedule management function by which the power storage unit 220 is charged from the house 100 (system power supply 300) based on the information on demand response received from the electric power provider 310 as described above. On the other hand, the HEMS 130 in the house 100 also has the schedule management function by which power is fed to the vehicle 200 based on the information on demand response received from the electric power provider 310.

If the vehicle 200, which receives a supply of power from the house 100, also has the schedule management function as described above, there may be interference between the schedule management function of the vehicle 200 (ECU 240) and the schedule management function of the HEMS 130. To address this problem, the ECU 240 communicates with the HEMS 130 in the first embodiment to compare its own schedule management function with the schedule management function of the HEMS 130. After that, based on the comparison result, the ECU 240 determines which, either the ECU 240 itself or the HEMS 130, will manage the schedule of power feeding from the house 100 to the vehicle 200 (charging of the power storage unit 220). This prevents interference between the schedule management function of the ECU 240 and the schedule management function of the HEMS 130, thus appropriately managing the power feeding from the house 100 to the vehicle 200 (charging of the power storage unit 220).

Figure 3:
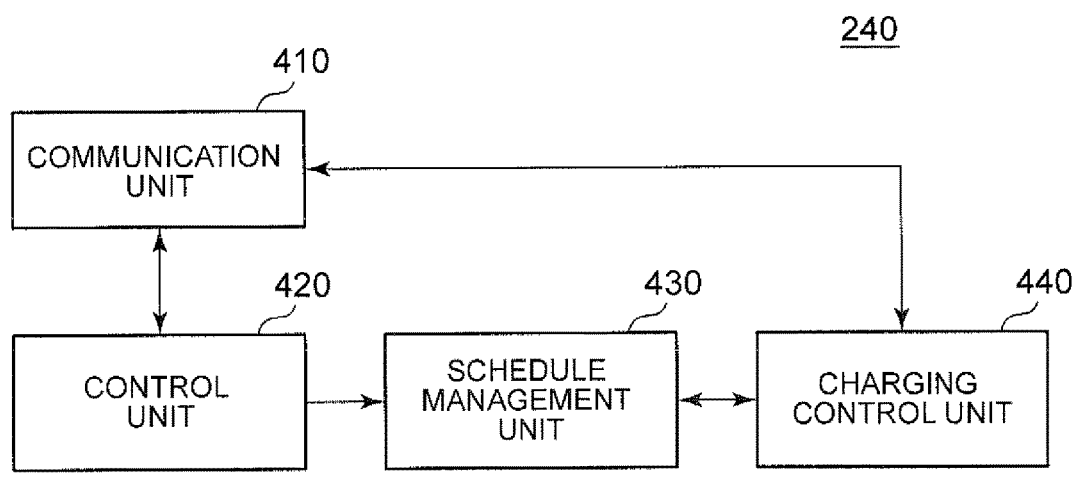
FIG. 3 is a functional block diagram of the ECU shown in FIG. 1.

FIG. 3 is a functional block diagram of the ECU 240 shown in FIG. 1. Note that, out of the various control parts performed by the ECU 240, FIG. 3 shows only the part that is extracted in order to show the control for charging the power storage unit 220 with the use of the charger 210. Referring to FIG. 3, the ECU 240 includes a communication unit 410, a control unit 420, a schedule management unit 430, and a charging control unit 440.

The communication unit 410 is configured by the communication apparatuses for communicating with the HEMS 130 in the house 100 (FIG. 1). For example, the communication unit 410 includes the apparatuses for carrying out power line communication (PLC) with the HEMS 130 via the power line when the vehicle 200 is connected to the house 100 via the power cable 150. Instead, the communication unit 410 may include the apparatuses for carrying out wireless communication with the HEMS 130.

The control unit 420 determines which, either the ECU 240 itself (schedule management unit 430 that will be described later) or the HEMS 130, will manage the schedule of power feeding from the house 100 to the vehicle 200 (charging of the power storage unit 220). In more detail, the control unit 420 communicates with the HEMS 130 via the communication unit 410 and, according to the processing flow that will be described later, compares the schedule management function of the ECU 240 (schedule management function for charging with the use of the charger 210) and the schedule management function of the HEMS 130 (schedule management function for power feeding to the vehicle 200). After that, based on the comparison result, the control unit 420 determines whether the vehicle 200 (ECU 240) will manage the schedule or the HEMS 130 in the house 100 will manage the schedule. The processing flow performed by the control unit 420 will be described in detail later.

If it is determined that the vehicle 200 (ECU 240) will manage the schedule, the control unit 420 informs the schedule management unit 430 about it. On the other hand, if it is determined that the HEMS 130 will manage the schedule, the control unit 420 informs the HEMS 130 about it via the communication unit 410.

If the control unit 420 determines that the vehicle 200 (ECU 240) will manage the schedule, the schedule management unit 430 creates a schedule for charging the power storage unit 220 with the use of the charger 210 and executes the schedule. In the first embodiment, the ECU 240 receives the information on demand response, provided by the electric power provider 310, from the HEMS 130 via the communication unit 410. Based on the received demand response information, the schedule management unit 430 creates and executes the schedule.

When a charging execution command is received from the schedule management unit 430, the charging control unit 440 generates a signal for driving the charger 210 and outputs the generated signal to the charger 210. In addition, when a charging stop command is received from the schedule management unit 430, the charging control unit 440 generates a signal for stopping the charger 210 and outputs the generated signal to the charger 210.

If the control unit 420 determines that the HEMS 130 will manage the schedule, the HEMS 130 is informed about it. Then, the HEMS 130 creates a schedule of power feeding from the house 100 to the vehicle 200 and executes the created schedule. More specifically, the HEMS 130 creates the schedule based on the information on demand response, received from the electric power provider 310, and executes the created schedule. After that, the charging execution command/stop command is sent from the HEMS 130 to the ECU 240 and, according to the command received from the communication unit 410, the charging control unit 440 controls the charger 210.

Figure 4:
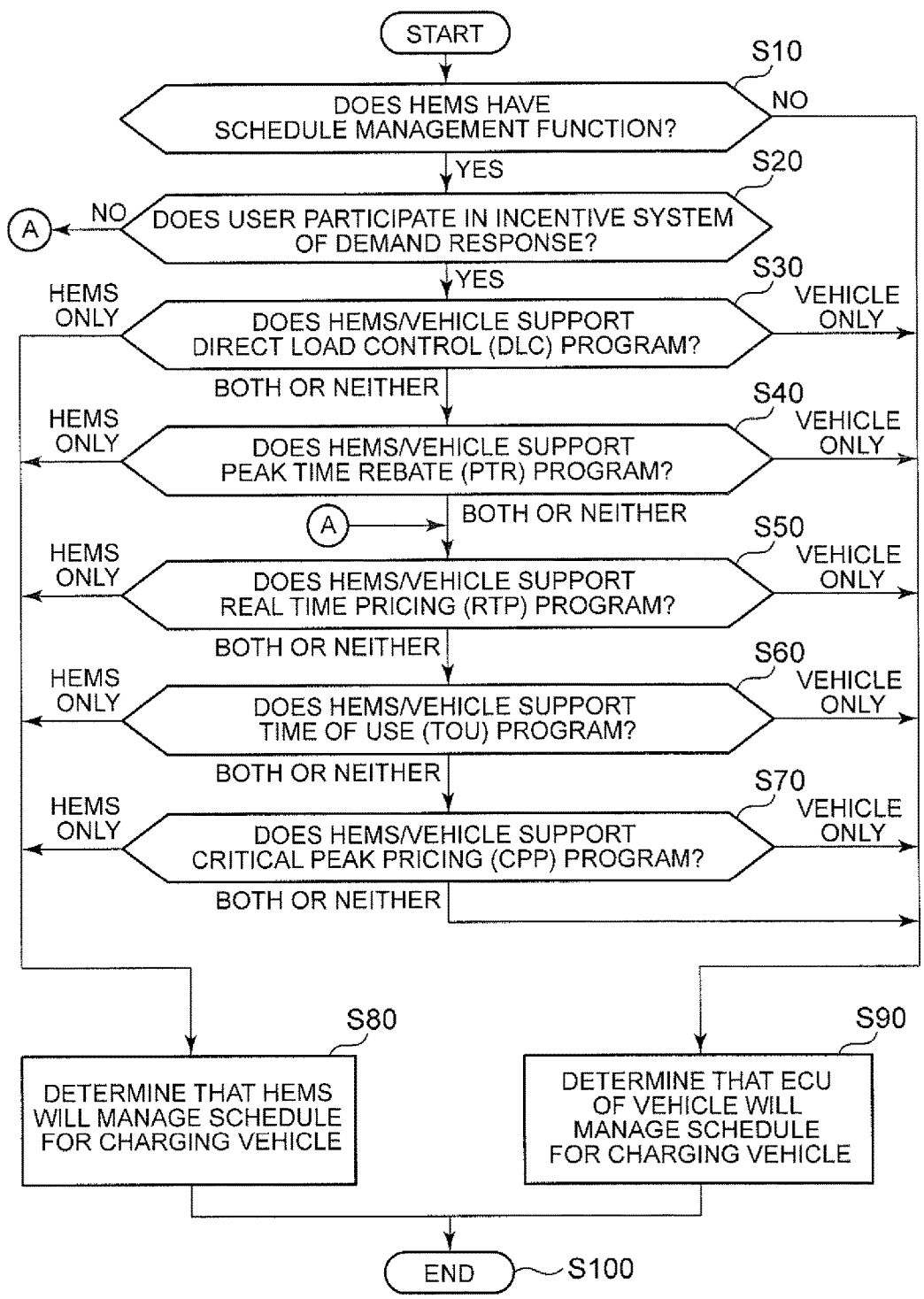
FIG. 4 is a flowchart showing a processing procedure for determining which, either the ECU of a vehicle or HEMS, will manage the schedule of power feeding from a house to the vehicle (charging of the power storage unit of the vehicle)

FIG. 4 is a flowchart showing a processing procedure for determining which, either the ECU 240 of the vehicle 200 or the HEMS 130, will manage the schedule of power feeding from the house 100 to the vehicle 200 (charging of the power storage unit 220 of the vehicle 200).

Referring to FIG. 4, the ECU 240 communicates with the HEMS 130 to determine whether the HEMS 130 has the schedule management function for power feeding to the vehicle 200 (step S10). If the HEMS 130 does not have the schedule management function (NO in step S10), the ECU 240 determines that the ECU 240 will manage the schedule for charging the power storage unit 220 with the use of the charger 210 (step S90).

If it is determined in step S10 that the HEMS 130 has the schedule management function (YES in step S10), the ECU 240 determines whether the user participates in the incentive system of demand response (step S20). The ECU 240 determines whether the user participates in the incentive system, based on whether the incentive-based contract is made between the user and the electric power provider. The information on whether the user participates in the incentive system is stored by the HEMS 130. The ECU 240 can communicate with the HEMS 130 to acquire that information.

If it is determined in step S20 that the user participates in the incentive system (YES in step S20), the ECU 240 determines whether the HEMS 130 and the vehicle 200 support the Direct Load Control (DLC) program (step S30). As described above, the incentive-based method includes the Peak Time Rebate (PTR) program and the DLC program.

In this step, a determination is made whether each of the HEMS 130 and the vehicle 200 (ECU 240) supports the DLC program.

If it is determined in step S30 that only the HEMS 130 supports the DLC program ("HEMS only" in step S30), the ECU 240 determines that the HEMS 130 will manage the charging schedule for the vehicle 200 (schedule of power feeding from the house 100 to the vehicle 200) (step S80). On the other hand, if it is determined in step S30 that only the vehicle 200 (ECU 240) supports the DLC program ("vehicle only" in step S30), the ECU 240 proceeds to the processing in step S90 and determines that the ECU 240 will manage the charging schedule for the vehicle 200.

If it is determined in step S30 that both or neither of the HEMS 130 and the vehicle 200 (ECU 240) supports the DLC program ("both or neither" in step S30), the ECU 240 determines whether the HEMS 130 and the vehicle 200 support the PTR program (step S40).

If it is determined in step S40 that only the HEMS 130 supports the PTR program ("HEMS only" in step S40), the ECU 240 proceeds to the processing in step S80 and determines that the HEMS 130 will manage the charging schedule for the vehicle 200 (schedule of power feeding from the house 100 to the vehicle 200). On the other hand, if it is determined in step S40 that only the vehicle 200 (ECU 240) supports the PTR program ("vehicle only" in step S40), the ECU 240 proceeds to the processing in step S90 and determines that the ECU 240 will manage the charging schedule for the vehicle 200.

For the incentive-based method, the DLC program has priority over the PTR program in the first embodiment as described above. In the DLC program, a consumer is forced to reduce or interrupt the load when the power supply is critical. Therefore, if one of the HEMS 130 and the vehicle 200 (ECU 240) supports the DLC program, the charging schedule is managed preferentially according to its schedule management.

If it is determined in step S40 that both or neither of the HEMS 130 and the vehicle 200 (ECU 240) supports the PTR program ("both or neither" in step S40), the ECU 240 determines whether the HEMS 130 and the vehicle 200 support the rate-based Real Time Pricing (RTP) program (step S50). That is, if the comparison of the incentive-based functions indicates that it cannot be determined which, either the HEMS 130 or the vehicle 200, will manage the schedule, the comparison of the rate-based functions is performed next. The rate-based method includes the Time Of Use (TOU) program, Critical Peak Pricing (CPP) program, and Real Time Pricing (RTP) program. First, the ECU 240 determines whether each of the HEMS 130 and the vehicle 200 (ECU 240) supports the RTP program.

If it is determined in step S50 that only the HEMS 130 supports the RTP program ("HEMS only" in step S50), the ECU 240 proceeds to step S80 and determines that the HEMS 130 will manage the charging schedule for the vehicle 200 (schedule of power feeding from the house 100 to the vehicle 200). On the other hand, if it is determined in step S50 that only the vehicle 200 (ECU 240) supports the RTP program ("vehicle only" in step S50), the ECU 240 proceeds to the processing in step S90 and determines that the ECU 240 will manage the charging schedule for the vehicle 200.

If it is determined in step S50 that both or neither of the HEMS 130 and the vehicle 200 (ECU 240) supports the RTP program ("both or neither" in step S50), the ECU 240 determines whether the HEMS 130 and the vehicle 200 support the Time Of Use (TOU) program (step S60).

If it is determined in step S60 that only the HEMS 130 supports the TOU program ("HEMS only" in step S60), the ECU 240 proceeds to the processing in step S80 and determines that the HEMS 130 will manage the charging schedule for the vehicle 200 (schedule of power feeding from the house 100 to the vehicle 200). On the other hand, if it is determined in step S60 that only the ECU 240 supports the TOU program ("vehicle only" in step S60), the ECU 240 proceeds to the processing in step S90 and determines that the ECU 240 will manage the charging schedule for the vehicle 200.

If it is determined in step S60 that both or neither of the HEMS 130 and the vehicle 200 (ECU 240) supports the TOU program ("both or neither" in step S60), the ECU 240 determines whether the HEMS 130 and the vehicle 200 support the Critical Peak Pricing (CPP) program (step S70).

If it is determined in step S70 that only the HEMS 130 supports the CPP program ("HEMS only" in step S70), the ECU 240 proceeds to the processing in step S80 and determines that the HEMS 130 will manage the charging schedule for the vehicle 200 (schedule of power feeding from the house 100 to the vehicle 200). On the other hand, if it is determined in step S70 that only the ECU 240 supports the CPP program ("vehicle only" in step S70), the ECU 240 proceeds to the processing in step S90 and determines that the ECU 240 will manage the charging schedule for the vehicle 200.

For the rate-based method, the priority is in the order of the RTP program, TOU program, and CPP program in the first embodiment as described above.

If it is determined in step S70 that both or neither of the HEMS 130 and the vehicle 200 (ECU 240) supports the CPP program ("both or neither" in step S70), the ECU 240 proceeds to the processing in step S90 and determines that the ECU 240 will manage the charging schedule for the vehicle 200. In this case, the comparison of the demand response functions indicates that it cannot be determined which, either the HEMS 130 or the vehicle 200 (ECU 240), will manage the schedule. In such a case, because there are elements other than demand responses, for example, the durability of the charger or other empirical values, as the considerations for the charging schedule in the vehicle 200, it is determined that the ECU 240 of the vehicle 200 will manage the charging schedule. The procedure then ends in step S100.

On the other hand, if it is determined in step S20 that the user does not participate in the incentive system (NO in step S20), the ECU 240 proceeds to the processing in step S50. That is, if the user does not participate in the incentive system, the function comparison is performed, not for the functions of the incentive-based method, but only for the functions of the rate-based method.

In the first embodiment, the schedule management function of the HEMS 130 and the schedule management function of the vehicle 200 (ECU 240) are compared for the schedule management of power feeding from the house 100 to the vehicle 200 (charging of the power storage unit 220 in the vehicle 200) as described above. More specifically, the support states of both are compared for each method of demand response. After that, based on the comparison result, it is determined which, either the vehicle 200 (ECU 240) or the HEMS 130, will manage the schedule. Therefore, this first embodiment prevents interference between the schedule management function of the vehicle 200 (ECU 240) and the schedule management function of the HEMS 130, thus appropriately managing power feeding from the house 100 to the vehicle 200 (charging of the power storage unit 220 in the vehicle 200).

[Second embodiment] In the first embodiment, the schedule management function of the vehicle 200 (ECU 240) and the schedule management function of the HEMS 130 are compared for the support states of each method of demand response. In this second embodiment, the vehicle 200 (ECU 240) and the HEMS 130 are compared for the presence of the user setting information on the schedule and, if there is no user setting information, for the presence of the user behavior prediction function. After that, based on the comparison result, it is determined which, either the vehicle 200 (ECU 240) or the HEMS 130, will manage the schedule.

The general configuration of a power supply system, and the configuration of the ECU 240 of the vehicle 200, in the second embodiment are the same as those shown in FIG. 1 and FIG. 3.

Figure 5:
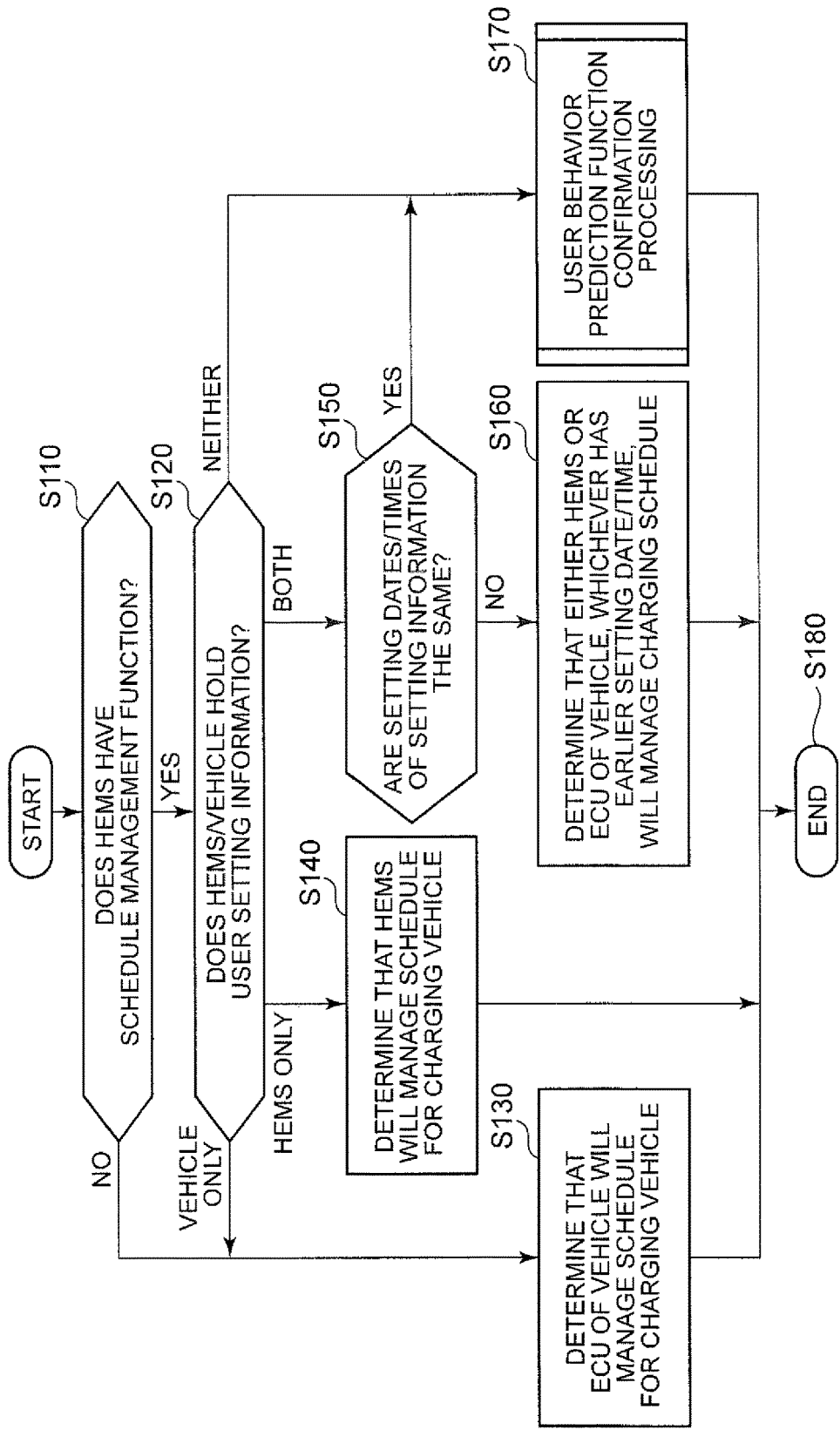
FIG. 5 is a flowchart showing a processing procedure for determining which, either the ECU of a vehicle or HEMS, will manage the schedule of power feeding from a house to the vehicle in a second embodiment (charging of the power storage unit of the vehicle)

FIG. 5 is a flowchart showing a processing procedure for determining which, either the ECU 240 of the vehicle 200 or the HEMS 130, will manage the schedule of power feeding from the house 100 to the vehicle 200 (charging of the power storage unit 220 of the vehicle 200) in the second embodiment.

Referring to FIG. 5, the ECU 240 communicates with the HEMS 130 to determine whether the HEMS 130 has the schedule management function for power feeding to the vehicle 200 (step S110). If the HEMS 130 does not have the schedule management function (NO in step S110), the ECU 240 determines that the ECU 240 will manage the schedule for charging the power storage unit 220 with the use of the charger 210 (step S130).

If it is determined in step S110 that the HEMS 130 has the schedule management function (YES in step S110), the ECU 240 determines whether the HEMS 130 and the vehicle 200 (ECU 240) hold the user setting information on the schedule (step S120). Although not shown explicitly in FIGS. 1 and 3, each of the vehicle 200 and the HEMS 130 has an input unit via which the user can set a schedule of power feeding from the house 100 to the vehicle 200 (charging of the power storage unit 220 in the vehicle 200).

If it is determined in step S120 that only the vehicle 200 holds the user setting information ("vehicle only" in step S120), the ECU 240 proceeds to the processing in step S130 and determines that the ECU 240 will manage the charging schedule for the vehicle 200. If it is determined in step S120 that only the HEMS 130 holds the user setting information ("HEMS only" in step S120), the ECU 240 determines that the HEMS 130 will manage the charging schedule for the vehicle 200 (schedule of power feeding from the house 100 to the vehicle 200) (step S140).

If it is determined in step S120 that both the HEMS 130 and the ECU 240 hold the user setting information on the charging schedule for the vehicle 200 ("both" in step S120), the ECU 240 determines whether the setting date/time of the setting information held by the ECU 240 and the setting date/time of the setting information held by the HEMS 130 are the same (step S150). If it is determined that the setting dates/times are not the same (NO in step S150), the ECU 240 determines that either the HEMS 130 or the ECU 240, whichever has the schedule with an earlier setting date/time, will manage the charging schedule (step S160).

If it is determined in step S120 that neither HEMS 130 nor the ECU 240 holds the user setting information on the charging schedule for the vehicle 200 ("neither" in step S120) or if it is determined in step S150 that the setting dates/times are the same (YES in step S150), the ECU 240 confirms the presence of the "user behavior prediction function" that predicts the user behavior (step S170). The procedure ends (step S180) after performance of steps S130, S160 or S170.

Figure 6:
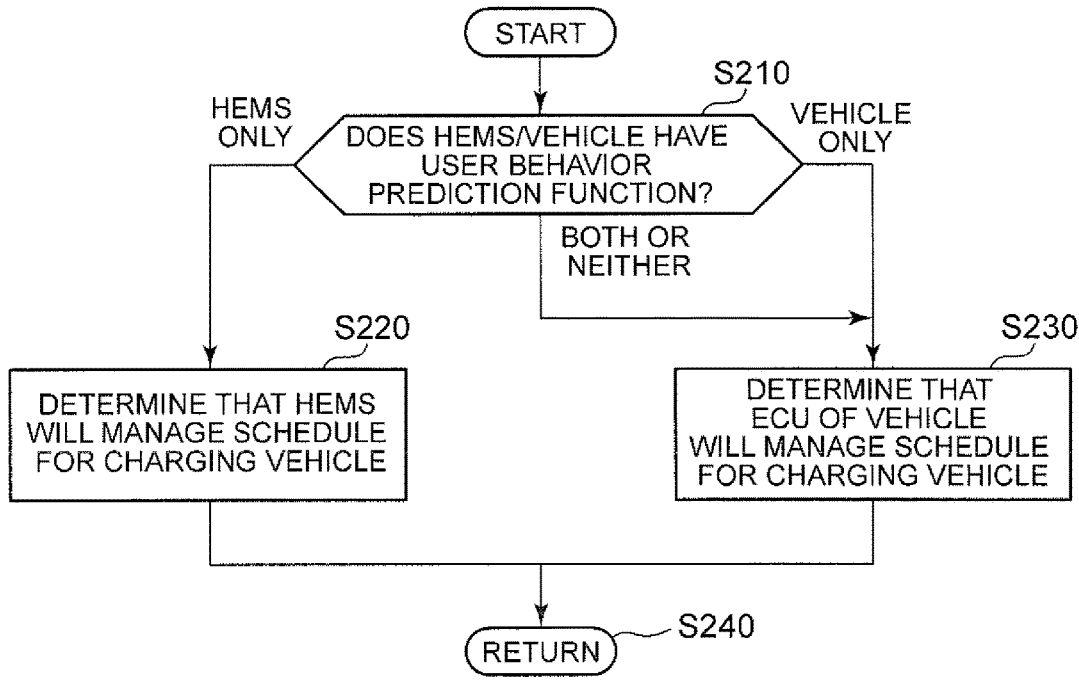
FIG. 6 is a flowchart showing the "user behavior prediction function confirmation processing" performed in step S170 in FIG. 5.

FIG. 6 is a flowchart showing the "user behavior prediction function confirmation processing" performed in step S170 in FIG. 5. Referring to FIG. 6, the ECU 240 determines whether the HEMS 130 and the vehicle 200 (ECU 240) have the "user behavior prediction function" (step S210). The "user behavior prediction function" refers to the function to learn about the daily behavior of the user and to predict the behavior of the user based on the learning result. For example, if the user charges the vehicle 200 in a predetermined time zone every night at midnight, the function predicts such a user's behavior.

If it is determined in step S210 that only the HEMS 130 has the user behavior prediction function ("HEMS only" in step S210), the ECU 240 determines that the HEMS 130 will manage the charging schedule for the vehicle 200 (schedule of power feeding from the house 100 to the vehicle 200) (step S220). On the other hand, if it is determined in step S210 that only the vehicle 200 has the user behavior prediction function ("vehicle only" in step S210), the ECU 240 determines that the ECU 240 will manage the charging schedule for the vehicle 200 (step S230).

If it is determined in step S210 that both or neither of the HEMS 130 and the ECU 240 has the user behavior prediction function ("both or neither" in step S210), the ECU 240 proceeds to the processing in step S230 and determines that the ECU 240 will manage the charging schedule for the vehicle 200. In this case, the comparison of the presence of the user setting information and the comparison of the presence of the user behavior prediction function indicate that it cannot be determined which, either the HEMS 130 or the ECU 240, will manage the schedule. In such a case, because there are elements other than demand responses, for example, the durability of the charger or other empirical values, as the considerations for the charging schedule in the vehicle 200, it is determined that the ECU 240 of the vehicle 200 will manage the charging schedule. The FIG. 6 procedure then ends in step S240.

In the second embodiment, the vehicle 200 (ECU 240) and the HEMS 130 are compared for the presence of the user setting information on the schedule and, if neither has the user setting information or if the setting dates/times of the user setting information are the same, for the presence of the user behavior prediction function as described above. After that, based on the comparison result, it is determined which, either the vehicle 200 (ECU 240) or the HEMS 130, will manage the schedule. Therefore, this second embodiment also prevents interference between the schedule management function of the vehicle 200 (ECU 240) and the schedule management function of the HEMS 130, thus appropriately managing power feeding from the house 100 to the vehicle 200 (charging of the power storage unit 220 in the vehicle 200).

[Third Embodiment] A third embodiment corresponds to a combination of the first and second embodiments described above. In the third embodiment, the schedule management based on the user setting information or the user behavior prediction has priority over the schedule management based on the support states of demand response. That is, the vehicle 200 (ECU 240) and the HEMS 130 are compared first for the presence of the user setting information on the schedule and, if neither has the user setting information or if the setting dates/times of the user setting information are the same, for the presence of the user behavior prediction function. After that, both are compared for the support states of each method of demand response.

The general flow of a processing procedure for determining which, either the ECU 240 of the vehicle 200 or the HEMS 130, will manage the schedule of power feeding from the house 100 to the vehicle 200 in the third embodiment (charging of the power storage unit 220 in the vehicle 200) is shown by the flow shown in FIG. 5. The contents of the "user behavior prediction function confirmation processing" performed in step S170 differ from those in the second embodiment.

Figure 7:
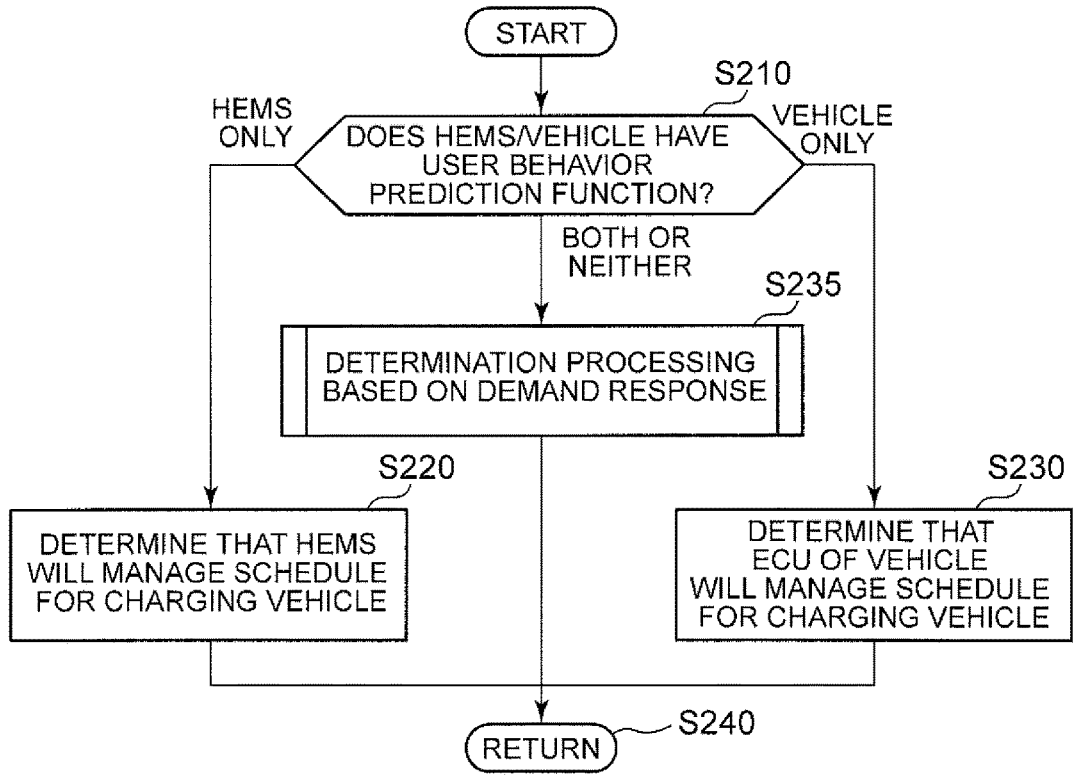
FIG. 7 is a flowchart showing the "user behavior prediction function confirmation processing" performed in step S170 in FIG. 5 in a third embodiment.

FIG. 7 is a flowchart showing the "user behavior prediction function confirmation processing" performed in step S170 in FIG. 5 in the third embodiment. Referring to FIG. 7, the flowchart differs from the flowchart in the second embodiment shown in FIG. 6 in that the flowchart further includes step S235.

That is, if it is determined in step S210 that both or neither of the HEMS 130 and the ECU 240 has the user behavior prediction function ("both or neither" in step S210), the ECU 240 performs the determination processing based on demand response (step S235). If the comparison of the presence of the user setting information and the comparison of the presence of the user behavior prediction function indicate that it cannot be determined which, either the HEMS 130 or the ECU 240, will manage the schedule, both are compared for the support states of each method of demand response to determine which, either the HEMS 130 or the ECU 240, will manage the schedule.

Figure 8:
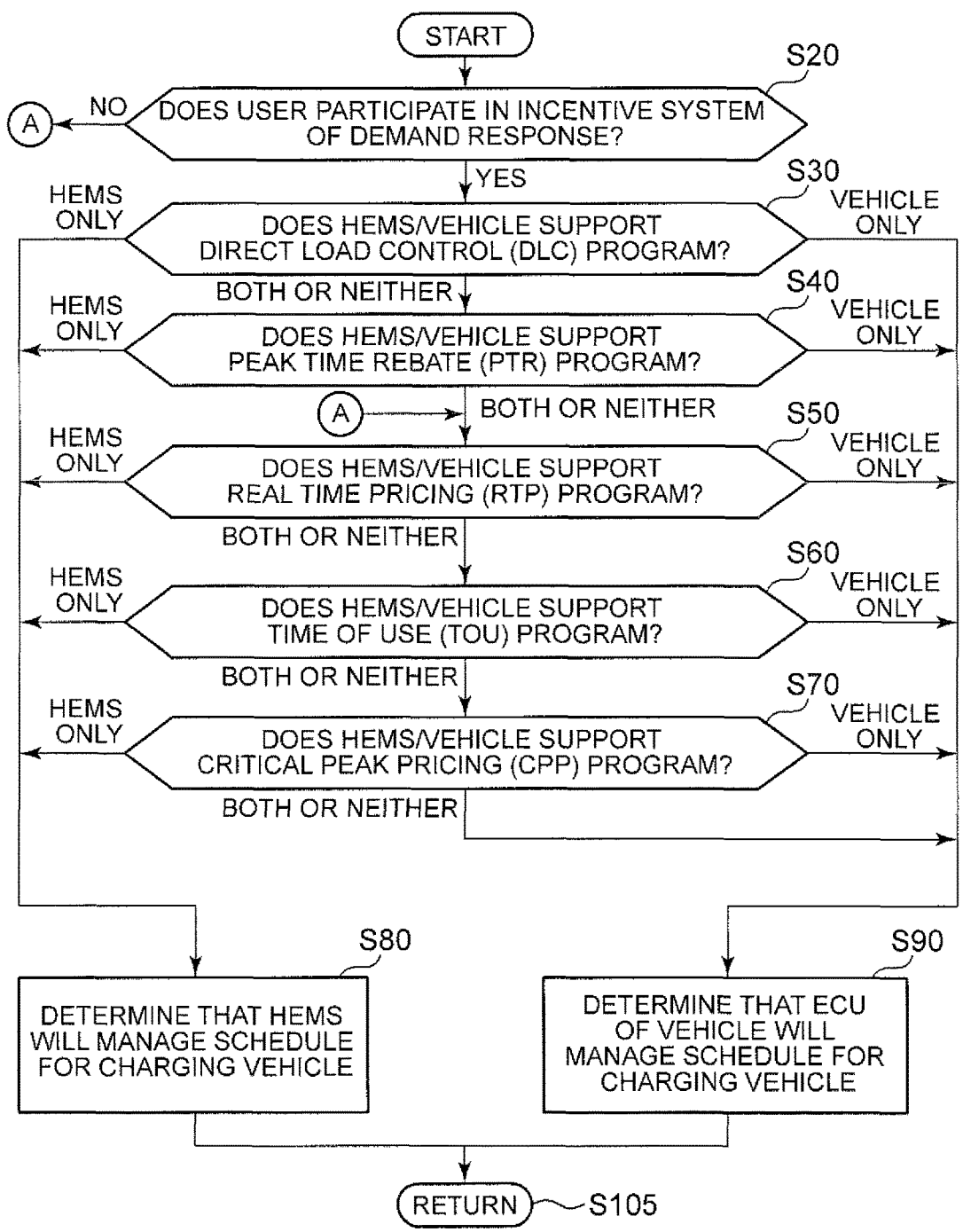
FIG. 8 is a flowchart showing the "determination processing based on demand response" performed in step S235 in FIG. 7.

FIG. 8 is a flowchart showing the "determination processing based on demand response" performed in step S235 in FIG. 7. Referring to FIG. 8, this flowchart differs from the flowchart shown in FIG. 4 in that step S10 is not included and in that step S105 is included instead of step S100.

Step S10 is not included because the same processing as that in step S10 is already performed in step S110 in FIG. 5. Step S105 is included instead of step S100 to return control to the flow shown in FIG. 7 after a series of processing shown in FIG. 8 is performed.

This third embodiment also prevents interference between the schedule management function of the vehicle 200 (ECU 240) and the schedule management function of the HEMS 130, thus appropriately managing power feeding from the house 100 to the vehicle 200 (charging of the power storage unit 220 in the vehicle 200).

[Fourth embodiment] In the embodiments described above, the ECU 240 in the vehicle 200 determines whether the vehicle 200 (ECU 240) will manage the schedule or the HEMS 130 in the house 100 will manage the schedule. Instead, in this fourth embodiment, the HEMS 130 in the house 100 determines which will manage the schedule. The fourth embodiment corresponds to the first embodiment described above.

Figure 9:
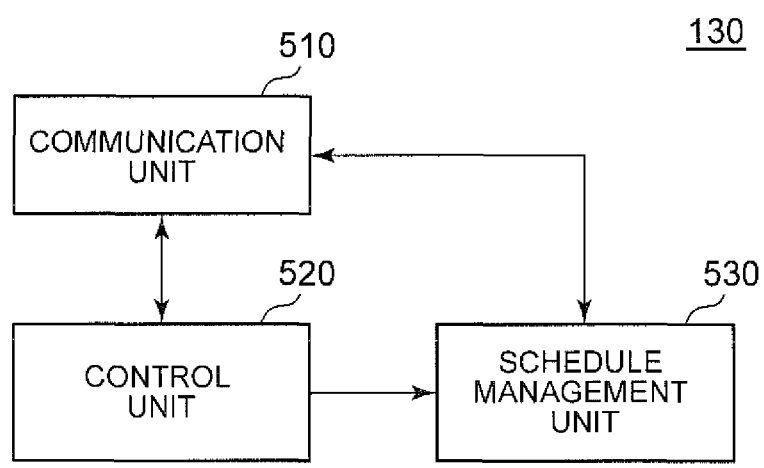
FIG. 9 is a functional block diagram of HEMS in a fourth embodiment.

FIG. 9 is a functional block diagram of the HEMS 130 in the fourth embodiment. Note that, out of various control parts performed by the HEMS 130, FIG. 9 shows only the part that is extracted to show the part for power feeding from the house 100 to the vehicle 200. Referring to FIG. 9, the HEMS 130 includes a communication unit 510, a control unit 520, and a schedule management unit 530.

The communication unit 510 is configured by the communication apparatuses for communicating with the vehicle 200 and the electric power provider 310. For example, when the vehicle 200 is connected to the house 100 via the power cable 150, the communication unit 510 includes the apparatuses for carrying out power line communication (PLC) with the vehicle 200 via the power line. Instead, the communication unit 510 may include the apparatuses for carrying out wireless communication with the vehicle 200.

The control unit 520 determines which, either the HEMS 130 itself (schedule management unit 530 that will be described later) or the vehicle 200, will manage the schedule of power feeding from the house 100 to the vehicle 200. In more detail, the control unit 520 communicates with the vehicle 200 via the communication unit 510 and, according to the processing flow that will be described later, compares the schedule management function of the HEMS 130 (schedule management function for power feeding to the vehicle 200) and the schedule management function of the vehicle 200 (schedule management function for charging with the use of the charger 210). After that, based on the comparison result, the control unit 520 determines whether the HEMS 130 will manage the schedule or the vehicle 200 will manage the schedule. The processing flow performed by the control unit 520 will be described in detail later.

If it is determined that the HEMS 130 will manage the schedule, the control unit 520 informs the schedule management unit 530 about it. On the other hand, if it is determined that the vehicle 200 will manage the schedule, the control unit 520 informs the vehicle 200 about it via the communication unit 510.

If the control unit 520 determines that the HEMS 130 will manage the schedule, the schedule management unit 530 creates a schedule of power feeding from the house 100 to the vehicle 200 and executes the schedule. In the fourth embodiment, the communication unit 510 receives the information on demand response, provided by the electric power provider 310. Based on the received demand response information, the schedule management unit 530 creates and executes the schedule.

If the control unit 520 determines that the vehicle 200 will manage the schedule, a charging schedule is created and executed in the vehicle 200. More specifically, the information on demand response is sent from the HEMS 130 to the vehicle 200 and, based on that information, a charging schedule is created and executed in the vehicle 200.

Figure 10:
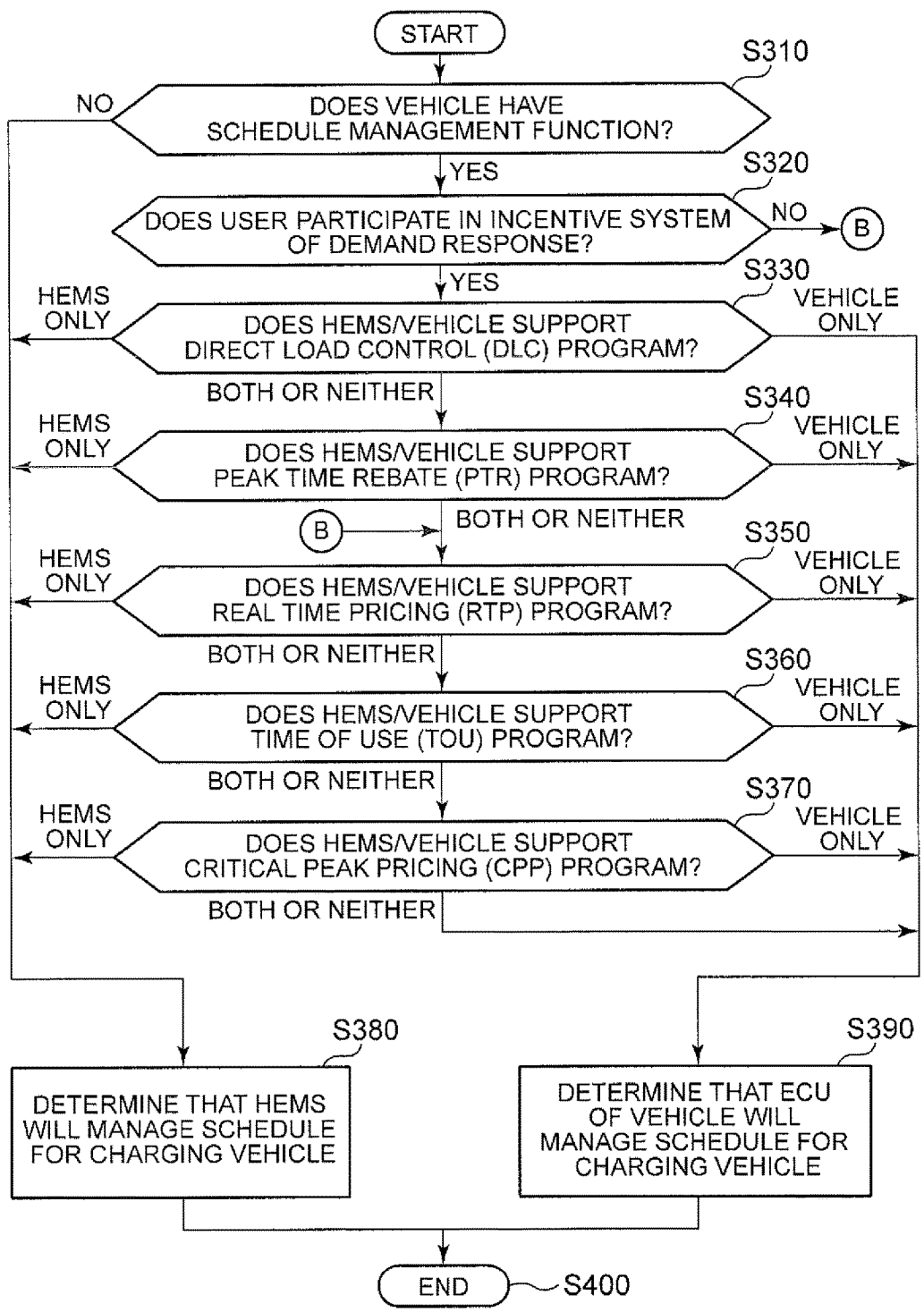
FIG. 10 is a flowchart showing a processing procedure for determining which, either HEMS or the ECU of a vehicle, will manage the schedule of power feeding from a house to the vehicle in a fourth embodiment.

FIG. 10 is a flowchart showing a processing procedure for determining which, either the HEMS 130 or the vehicle 200, will manage the schedule of power feeding from the house 100 to the vehicle 200 in the fourth embodiment.

Referring to FIG. 10, the HEMS 130 communicates with the vehicle 200 to determine whether the vehicle 200 has the schedule management function for charging the power storage unit 220 with the use of the charger 210 in the vehicle 200 (step S310). If the vehicle 200 does not have the schedule management function (NO in step S310), the HEMS 130 determines that the HEMS 130 will manage the charging schedule for the vehicle 200 (schedule of power feeding from the house 100 to the vehicle 200) (step S380).

If it is determined in step S310 that the vehicle 200 has the schedule management function (YES in step S310), the HEMS 130 determines whether the user participates in the incentive system of demand response (step S320).

Because the processing from step S320 to step S400 is the same as the processing from step S20 to step S100 shown in FIG. 4 except that the subject of the processing is not the ECU 240 of the vehicle 200 (FIG. 1) but the HEMS 130, the redundant description is not repeated. That is, steps S330, S340, S350, S360, S370, S390 and S400 respectively correspond to steps S30, S40, S50, S60, S70, S90 and S100.

This fourth embodiment also prevents interference between the schedule management function of the HEMS 130 and the schedule management function of the vehicle 200, thus appropriately managing power feeding from the house 100 to the vehicle 200 (charging of the power storage unit 220 in the vehicle 200).

[Fifth embodiment] In a fifth embodiment, too, the HEMS 130 in the house 100 determines whether the vehicle 200 (ECU 240) will manage the schedule or the HEMS 130 in the house 100 will manage the schedule. This fifth embodiment corresponds to the second embodiment described above.

Figure 11:
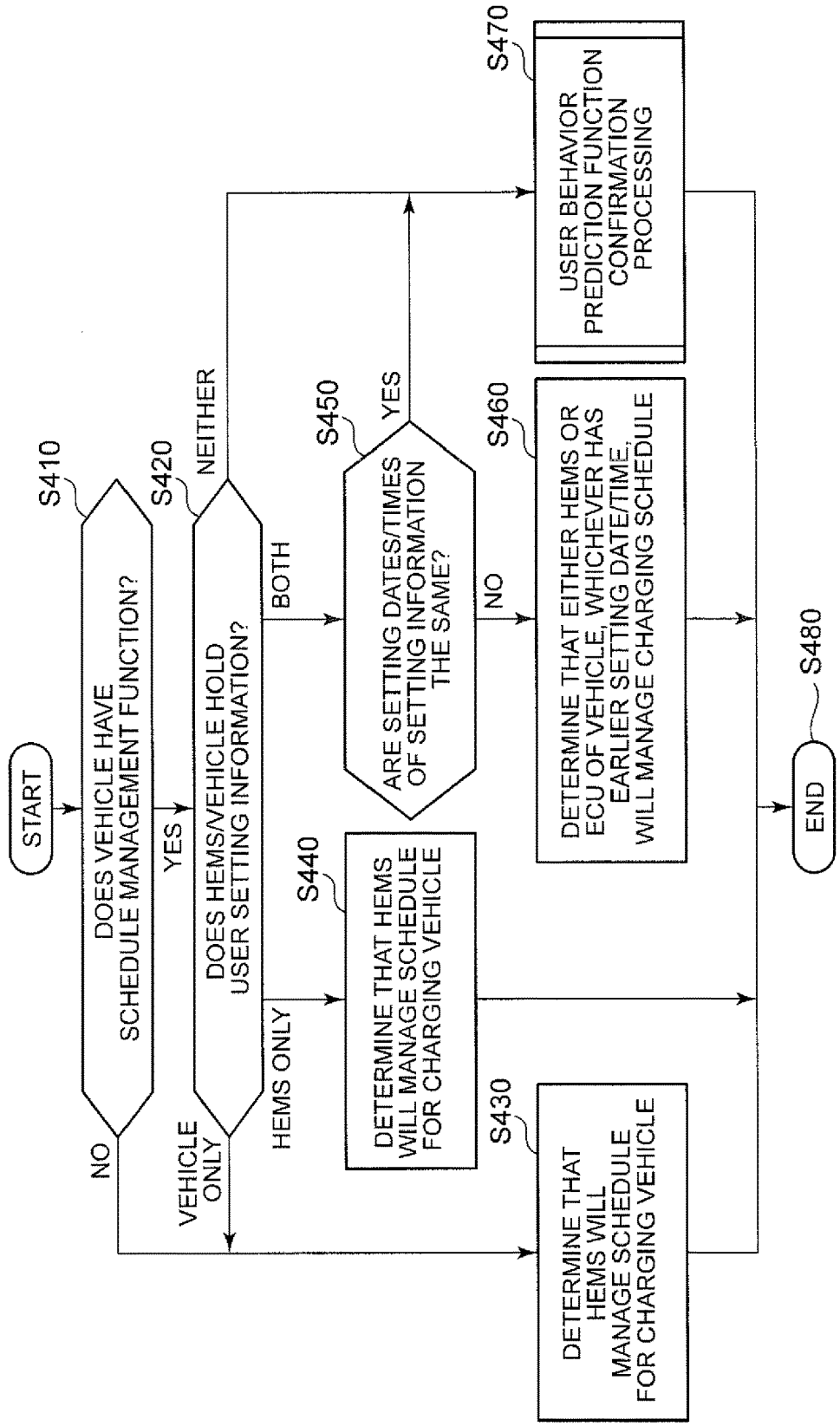
FIG. 11 is a flowchart showing a processing procedure for determining which, either. HEMS or the ECU of a vehicle, will manage the schedule of power feeding from a house to the vehicle in a fifth embodiment.

FIG. 11 is a flowchart showing a processing procedure for determining which, either the HEMS 130 or the vehicle 200, will manage the schedule of power feeding from the house 100 to the vehicle 200 in the fifth embodiment.

Referring to FIG. 11, the HEMS 130 communicates with the vehicle 200 to determine whether the vehicle 200 has the schedule management function for charging the power storage unit 220 with the use of the charger 210 in the vehicle 200 (step S410). If the vehicle 200 does not have the schedule management function (NO in step S410), the HEMS 130 determines that the HEMS 130 will manage the charging schedule for the vehicle 200 (schedule of power feeding from the house 100 to the vehicle 200) (step S430).

If it is determined in step S410 that the vehicle 200 has the schedule management function (YES in step S410), the HEMS 130 determines whether the HEMS 130 and the vehicle 200 have the user setting information on the schedule (step S420).

Because the processing from step S420 to step S480 is the same as the processing from step S120 to step S180 shown in FIG. 5 except that the subject of the processing is not the ECU 240 of the vehicle 200 (FIG. 1) but the HEMS 130, the redundant description is not repeated. That is, steps S440, S450, S460, S470 and S480 respectively correspond to steps S140, S150, S160, S170 and S180, The processing shown in FIG. 6 and the processing shown in FIGS. 7 and 8 may be applied also to the "user behavior prediction function confirmation processing" performed in step S470 with the subject of the processing being the HEMS 130.

This fifth embodiment also prevents interference between the schedule management function of the HEMS 130 and the schedule management function of the vehicle 200, thus appropriately managing power feeding from the house 100 to the vehicle 200 (charging of the power storage unit 220 in the vehicle 200).

[Sixth embodiment] In a sixth embodiment, a charging schedule is created in the vehicle 200. After that, it is determined whether the HEMS 130 will be able to manage the charging schedule for the vehicle 200 (schedule of power feeding from the house 100 to the vehicle 200) based on the schedule created in the vehicle 200. If the HEMS 130 is able to manage the charging schedule, the schedule is passed from the vehicle 200 to the HEMS 130 and the HEMS 130 manages the schedule.

The general configuration of a power supply system in the sixth embodiment is the same as the configuration shown in FIG. 1.

Figure 12:
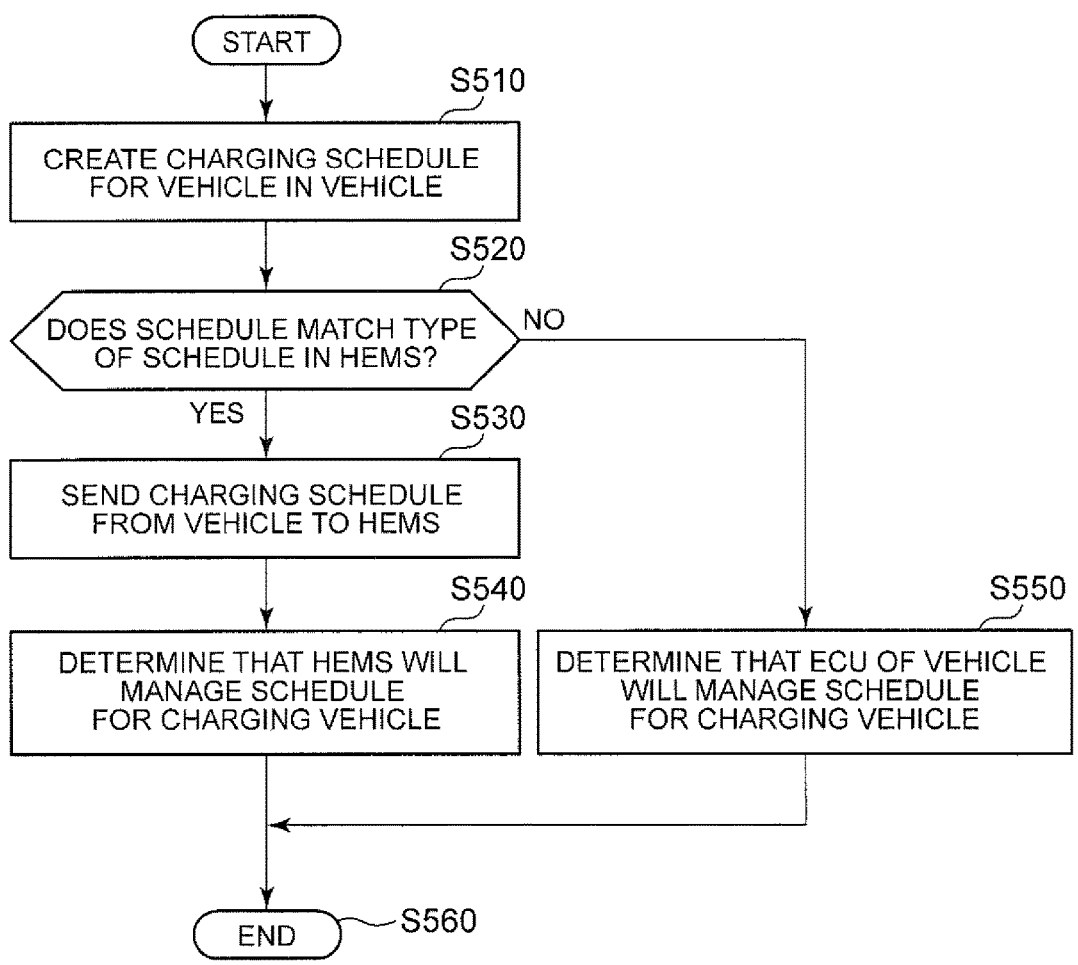
FIG. 12 is a flowchart showing a processing procedure for determining which, either the ECU of a vehicle or HEMS, will manage the schedule of power feeding from a house to the vehicle in a sixth embodiment (charging of the power storage unit of the vehicle).

FIG. 12 is a flowchart showing a processing procedure for determining which, either the ECU 240 of the vehicle 200 or HEMS 130, will manage the schedule of power feeding from the house 100 to the vehicle 200 (charging of the power storage unit 220 of the vehicle 200) in the sixth embodiment.

Referring to FIG. 12, the ECU 240 creates a charging schedule for the vehicle 200 (step S510). The charging schedule may be created from a variety of viewpoints. For example, the charging schedule may be created based on the user setting information, user behavior prediction, or the methods for demand response.

Next, the ECU 240 determines whether the created schedule matches the "type" of the schedule in the HEMS 130 (step S520). The "type" of schedule is a type that defines the schedule structure (start time specification, end time specification, charging time specification, multiple-specification, and so on), schedule time unit (seconds, minutes, hours, 24-hour units, 12-hour units, and so on), schedule instruction (charging start, stop, charging power, power amount, and so on), and the number of schedules.

If it is determined in step S520 that the created schedule matches the type of the schedule in the HEMS 130 (YES in step S520), the ECU 240 sends the created schedule to the HEMS 130 (step S530). After that, the ECU 240 determines that the HEMS 130 will manage the charging schedule for the vehicle 200 (schedule of power feeding from the 100 to the vehicle 200) (step S540).

On the other hand, if it is determined in step S520 that the created schedule does not match the type of the schedule in the HEMS 130 (NO in step S520), the ECU 240 determines that the ECU 240 will manage the charging schedule for the vehicle 200 according to the schedule created in step S510 (step S550). The procedure than ends in step S560.

In the sixth embodiment, if the HEMS 130 can manage the charging schedule for the vehicle 200 (schedule of power feeding from the house 100 to the vehicle 200), the vehicle 200 may turn off the power for schedule management. Therefore, the sixth embodiment reduces the standby power consumption of the vehicle 200 and reduces deterioration in the charging apparatus that may be caused by permanent voltage application.

In the above description, the house 100 corresponds to one example of a facility, and the vehicle 200 corresponds to one example of an "electrical apparatus." In addition, the HEMS 130 corresponds to one example of an "energy management system", and the ECU 240 corresponds to one example of a control device.

The embodiments disclosed herein are also intended to be combined as necessary and/or appropriate for implementation. The embodiments disclosed herein are to be considered merely illustrative and not restrictive in any respect.

What is claimed is:

1. A control device of an electrical apparatus configured to receive power from a facility that receives a supply of power from a system power supply, the facility including an energy management system that manages a power feeding schedule according to a first management function provided for managing the power feeding schedule for feeding power to the electrical apparatus, the control device comprising:
an electronic control unit configured to:
communicate with the energy management system;
manage the power feeding schedule according to a second management function provided for managing the power feeding schedule in the control device;
determine whether the electronic control unit or the energy management system of the facility will manage the power feeding schedule by comparing the first management function of the energy management system and the second management function of the control device; and
cause the electrical apparatus to receive the power from the facility as managed by the determined one of the electronic control unit and the energy management system of the facility so as to avoid interference between the first and second management functions;
wherein, upon a user participating in an incentive system that implements an incentive-based demand response:

(i) the energy management system of the facility manages the power feeding schedule upon the first management function supporting the incentive-based demand response and the second management function not supporting the incentive-based demand response;

(ii) the electronic control unit manages the power feeding schedule upon the first management function not supporting the incentive-based demand response and the second management function supporting the incentive-based demand response; and (iii) either the electronic control unit or the energy management system of the facility manages the power feeding schedule, based on whether the first management function and the second management function support rate-based demand response and upon either (a) both of the first management function and the second management function support the incentive-based demand response, or (b) neither one of the first management function and the second management function support the incentive-based demand response.

2. The control device of the electrical apparatus according to claim 1, wherein the incentive-based demand response includes a Direct Load Control (DLC) program in which the user is forced to reduce a load for reducing power according to the incentive system and a Peak Time Rebate (PTR) program in which the user is requested to reduce power according to the incentive system, and upon the user participating in the incentive system:

(i) the energy management system of the facility manages the power feeding schedule upon the first management function supporting the Direct Load Control program and the second management function not supporting the Direct Load Control program, (ii) the electronic control unit manages the power feeding schedule upon the first management function not supporting the Direct Load Control program and the second management function supporting the Direct Load Control program, (iii) the energy management system of the facility manages the power feeding schedule upon either (a) both of the first management function and the second management function supporting the Direct Load Control program, the first management function supporting the Peak Time Rebate program, and the second management function not supporting the Peak Time Rebate program, or (b) neither one of the first management function and the second management function supporting the Direct Load Control program, the first management function supporting the Peak Time Rebate program, and the second management function not supporting the Peak Time Rebate program, (iv) the electronic control unit manages the power feeding schedule upon both of the first management function and the second management function supporting the Direct Load Control program, the first management function not supporting the Peak Time Rebate program, and the second management function supporting the Peak Time Rebate program, and (v) the electronic control unit manages the power feeding schedule upon either (a) both of the first management function and the second management function supporting the Peak Time Rebate program, or (b) neither one of the first management function and the second management function supporting the Peak Time Rebate program.

3. The control device of the electrical apparatus according to claim 1, wherein upon the user participating in the incentive system and (a) both of the first management function and the second management function supporting the incentive-based demand response, or (b) neither one of the first management function and the second management function supporting the incentive-based demand response:

(i) the energy management system of the facility manages the power feeding schedule upon the first management function supporting a rate-based demand response and the second management function not supporting the rate-based demand response, (ii) the electronic control unit manages the power feeding schedule upon the first management function not supporting the rate-based demand response and the second management function supporting the rate-based demand response, and (iii) the electronic control unit manages the power feeding schedule upon either (a) both of the first management function and second management function supporting the rate-based demand response, or (b) neither one of the first management function and second management function supporting the rate-based demand response.

4. The control device of the electrical apparatus according to claim 3, wherein the rate-based demand response includes a Real Time Pricing (RTP) program in which a rate changes in real time according to a demand for power, a Time Of Use (TOU) program in which a rate is set in advance on a time zone basis, and a Critical Peak Pricing (CPP) program in which a rate rises at a power-demand peak time, and upon the user participating in the incentive system and either (a) both of the first management function and the second management function supporting the incentive-based demand response, (b) neither of the first management function and the second management function supporting the incentive-based demand response, or (c) the user not participating in the incentive system:

(i) the energy management system of the facility manages the power feeding schedule upon the first management function supporting the Real Time Pricing program and the second management function not supporting the Real Time Pricing program, (ii) the electronic control unit manages the power feeding schedule upon the first management function not supporting the Real Time Pricing program and the second management function supporting the Real Time Pricing program, (iii) the energy management system of the facility manages the power feeding schedule upon either (a) both of the first management function and the second management function supporting the Real Time Pricing program, the first management function supporting the Time Of Use program, and the second management function not supporting the Time Of Use program, or (b) neither one of the first management function and the second management function supports the Real Time Pricing program, the first management function supporting the Time Of Use program, and the second management function not supporting the Time Of Use program, (iv) the electronic control unit manages the power feeding schedule upon either (a) both of the first management function and the second management function supporting the Real Time Pricing program, the first management function not supporting the Time Of Use program, and the second management function supporting the Time Of Use program, or (b) neither one of the first management function and the second management function supports the Real Time Pricing program, the first management function not supporting the Time Of Use program, and the second management function supporting the Time Of Use program, (v) the energy management system of the facility manages the power feeding schedule upon both of the first management function and second management function supporting the Time Of Use program, the first management function supporting the Critical Peak Pricing program, and the second management function not supporting the Critical Peak Pricing program, (vi) the electronic control unit manages the power feeding schedule upon either (a) both of the first management function and the second management function supporting the Time Of Use program, the first management function not supporting the Critical Peak Pricing program, and the second management function supporting the Critical Peak Pricing program, or (b) neither one of the first management function and the second management function supporting the Time Of Use program, the first management function not supporting the Critical Peak Pricing program, and the second management function supporting the Critical Peak Pricing program, and (vii) the electronic control unit manages the power feeding schedule upon either (a) both of the first management function and the second management function supporting the Critical Peak Pricing program, or (b) neither one of the first management function and the second management function supporting the Critical Peak Pricing program.

5. The control device of the electrical apparatus according to claim 1, wherein the electrical apparatus is a vehicle configured to receive power from the facility to charge a vehicle-mounted charge storage device.

6. A control device of an electrical apparatus configured to receive power from a facility that receives a supply of power from a system power supply, the facility including an energy management system that manages a power feeding schedule according to a first management function provided for managing the power feeding schedule for feeding power to the electrical apparatus, the control device comprising:
an electronic control unit configured to:
communicate with the energy management system;
manage the power feeding schedule according to a second management function provided for managing the power feeding schedule in the control device;
determine whether the electronic control unit or the energy management system of the facility will manage the power feeding schedule by comparing the first management function of the energy management system and the second management function of the control device; and
cause the electrical apparatus to receive the power from the facility as managed by the determined one of the electronic control unit and the energy management system of the facility so as to avoid interference between the first and second management functions;
upon a user not participating in an incentive system for implementing incentive-based demand response:
(i) the energy management system of the facility manages the power feeding schedule upon the first management function supporting the rate-based demand response and the second management function not supporting the rate-based demand response;
(ii) the electronic control unit manages the power feeding schedule upon the first management function not supporting the rate-based demand response and the second management function supporting the rate-based demand response; and
(iii) the electronic control unit manages the power feeding schedule upon either (a) both of the first management function and second management function support the rate-based demand response, or (b) neither one of the first management function and the second management function support the rate-based demand response.

7. A control device of an electrical apparatus configured to receive power from a facility that receives a supply of power from a system power supply, the facility including an energy management system that manages a power feeding schedule according to a first management function provided for managing the power feeding schedule for feeding power to the electrical apparatus, the control device comprising:
an electronic control unit configured to:
communicate with the energy management system;
manage the power feeding schedule according to a second management function provided for managing the power feeding schedule in the control device;
determine whether the electronic control unit or the energy management system of the facility will manage the power feeding schedule by comparing the first management function of the energy management system and the second management function of the control device; and
cause the electrical apparatus to receive the power from the facility as managed by the determined one of the electronic control unit and the energy management system of the facility so as to avoid interference between the first and second management functions;
wherein:
(i) the energy management system of the facility manages the power feeding schedule upon the energy management system having setting information for the power feeding schedule set by a user and the control device not having setting information for the power feeding schedule set by the user, and
(ii) the electronic control unit manages the power feeding schedule upon (a) the control device having the setting information for the power feeding schedule set by the user and (b) the energy management system not having the setting information for the power feeding schedule set by the user.

8. The control device of the electrical apparatus according to claim 7, wherein
upon either (a) both of the energy management system and the control device having the setting information, or (b) neither one of the energy management system and the control device having the setting information:
(i) the energy management system of the facility manages the power feeding schedule upon the first management function including a prediction function to predict a user behavior and the second management function not including the prediction function to predict the user behavior, and (ii) the electronic control unit manages the power feeding schedule upon the first management function not including the prediction function, and the second management function including the prediction function.

9. An energy management system provided in a facility that receives a supply of power from a system power supply and configured to manage feeding of power to an electrical apparatus configured to receive power from the facility, the electrical apparatus being configured to manage a power feeding schedule according to a first management function provided for managing in the electrical apparatus the power feeding schedule for feeding power from the facility to the electrical apparatus, the energy management system comprising:

a processor configured to
communicate with the electrical apparatus;
manage the power feeding schedule according to a second management function provided for managing the power feeding schedule;
determine whether the processor or the electrical apparatus, will manage the power feeding schedule by comparing the first management function of the electrical apparatus and the second management function of the energy management system; and
cause the feeding of the power from the facility to the electrical apparatus as managed by the determined one of the electrical apparatus and the processor so as to avoid interference between the first and second management functions;

wherein upon a user participating in an incentive system for implementing an incentive-based demand response:
(i) the electrical apparatus manages the power feeding schedule upon the first management function supporting the incentive-based demand response and the second management function not supporting the incentive-based demand response;
(ii) the processor manages the power feeding schedule upon the first management function not supporting the incentive-based demand response and the second management function supporting the incentive-based demand response; and
(iii) either the processor or the electrical apparatus manages the power feeding schedule, based on whether the first management function and the second management function support rate-based demand response and upon both of the first management function and the second management function either (a) supporting the incentive-based demand response, or (b) not supporting the incentive-based demand response.

10. The energy management system according to claim 9 wherein:

the incentive-based demand response includes a Direct Load Control (DLC) program in which the user is forced to reduce a load for reducing power according to the incentive system and a Peak Time Rebate (PTR) program in which the user is requested to reduce power according to the incentive system, and upon the user participating in the incentive system:
(i) the electrical apparatus manages the power feeding schedule upon the first management function supporting the Direct Load Control program and the second management function not supporting the Direct Load Control program,
(ii) the processor manages the power feeding schedule upon the first management function not supporting the Direct Load Control program and the second management function supporting the Direct Load Control program,
(iii) the electrical apparatus manages the power feeding schedule upon either (a) both of the first management function and the second management function supporting the Direct Load Control program, the first management function supporting the Peak Time Rebate program, and the second management function not supporting the Peak Time Rebate program, or (b) neither one of the first management function and the second management function supporting the Direct Load Control program, the first management function supporting the Peak Time Rebate program, and the second management function not supporting the Peak Time Rebate program,
(iv) the processor manages the power feeding schedule upon either (a) both of the first management function and the second management function supporting the Direct Load Control program, the first management function not supporting the Peak Time Rebate program, and the second management function supporting the Peak Time Rebate program, or (b) neither one of the first management function and the second management function supporting the Direct Load Control program, the first management function not supporting the Peak Time Rebate program, and the second management function supporting the Peak Time Rebate program, and
(v) the electrical apparatus manages the power feeding schedule upon either (a) both of the first management function and the second management function supporting the Peak Time Rebate program, or (b) neither one of the first management function and the second management function supporting the Peak Time Rebate program.

11. The energy management system according to claim 9, wherein upon the user participating in the incentive system and upon either (a) both of the first management function and the second management function supporting the incentive-based demand response, or (b) neither one of the first management function and the second management function supporting the incentive-based demand response:
(i) the electrical apparatus manages the power feeding schedule upon the first management function supporting a rate-based demand response and the second management function not supporting the rate-based demand response,
(ii) the processor manages the power feeding schedule upon the first management function not supporting the rate-based demand response and the second management function supporting the rate-based demand response, and
(iii) the electrical apparatus manages the power feeding schedule upon either (a) both of the first management function and the second management function supporting the rate-based demand response, or (b) neither one of the first management function and the second management function supporting the rate-based demand response.

12. The energy management system according to claim 11, wherein the rate-based demand response includes a Real Time Pricing (RTP) program in which a rate changes in real time according to a demand for power, a Time Of Use (TOU) program in which a rate is set in advance on a time zone basis, and a Critical Peak Pricing (CPP) program in which a rate rises at a power-demand peak time, and upon the user participating in the incentive system and upon either (a) both of the first management function and second management function supporting the incentive-based demand response, (b) neither of the first management function and second management function supporting the incentive-based demand response, or (c) the user not participating in the incentive system:

(i) the electrical apparatus manages the power feeding schedule upon the first management function supporting the Real Time Pricing program and the second management function not supporting the Real Time Pricing program, (ii) the processor manages the power feeding schedule upon the first management function not supporting the Real Time Pricing program and the second management function supporting the Real Time Pricing program, (iii) the electrical apparatus manages the power feeding schedule upon either (a) both of the first management function and the second management function supporting the Real Time Pricing program, the first management function supporting the Time Of Use program, and the second management function not supporting the Time Of Use program, or (b) neither one of the first management function and the second management function supporting the Real Time Pricing program, the first management function supporting the Time Of Use program, and the second management function not supporting the Time Of Use program, (iv) the processor manages the power feeding schedule upon either (a) both of the first management function and second management function supporting the Real Time Pricing program, the first management function not supporting the Time Of Use program and the second management function supporting the Time Of Use program, or (b) neither one of the first management function and second management function supporting the Real Time Pricing program, the first management function not supporting the Time Of Use program and the second management function supporting the Time Of Use program, (v) the electrical apparatus manages the power feeding schedule upon either (a) both of the first management function and second management function supporting the Time Of Use program, the first management function supporting the Critical Peak Pricing program and the second management function not supporting the Critical Peak Pricing program, or (b) neither one of the first management function and second management function supporting the Time Of Use program, the first management function supporting the Critical Peak Pricing program and the second management function not supporting the Critical Peak Pricing program, and (vi) the processor manages the power feeding schedule upon either (a) both of the first management function and second management function supporting the Time Of Use program, the first management function not supporting the Critical Peak Pricing program and the second management function supporting the Critical Peak Pricing program, or (b) neither one of the first management function and second management function supporting the Time Of Use program, the first management function not supporting the Critical Peak Pricing program and the second management function supporting the Critical Peak Pricing program, and the electrical apparatus manages the power feeding schedule upon either (a) both of the first management function and second management function supporting the Critical Peak Pricing program, or (b) neither one of the first management function and second management function supporting the Critical Peak Pricing program.

13. The energy management system according to claim 9, wherein
the electrical apparatus is a vehicle configured to receive power from the facility to charge a vehicle-mounted charge storage device.

14. An energy management system provided in a facility that receives a supply of power from a system power supply and configured to manage feeding of power to an electrical apparatus configured to receive power from the facility, the electrical apparatus being configured to manage a power feeding schedule according to a first management function provided for managing in the electrical apparatus the power feeding schedule for feeding power from the facility to the electrical apparatus, the energy management system comprising:

a processor configured to
communicate with the electrical apparatus;
manage the power feeding schedule according to a second management function provided for managing the power feeding schedule;
determine whether the processor or the electrical apparatus, will manage the power feeding schedule by comparing the first management function of the electrical apparatus and the second management function of the energy management system; and
cause the feeding of the power from the facility to the electrical apparatus as managed by the determined one of the electrical apparatus and the processor so as to avoid interference between the first and second management functions;

upon a user not participating in an incentive system for implementing an incentive-based demand response:

(i) the electrical apparatus manages the power feeding schedule upon the first management function supporting a rate-based demand response and the second management function not supporting the rate-based demand response, (ii) the processor manages the power feeding schedule upon the first management function not supporting the rate-based demand response and the second management function supporting the rate-based demand response, and (iii) the electrical apparatus manages the power feeding schedule upon either (a) both of the first management function and the second management function supporting the rate-based demand response, or (b) neither one of the first management function and the second management function supporting the rate-based demand response.

15. An energy management system provided in a facility that receives a supply of power from a system power supply and configured to manage feeding of power to an electrical apparatus configured to receive power from the facility, the electrical apparatus being configured to manage a power feeding schedule according to a first management function provided for managing in the electrical apparatus the power feeding schedule for feeding power from the facility to the electrical apparatus, the energy management system comprising:
- a processor configured to
    - communicate with the electrical apparatus;
    - manage the power feeding schedule according to a second management function provided for managing the power feeding schedule;
    - determine whether the processor or the electrical apparatus, will manage the power feeding schedule by comparing the first management function of the electrical apparatus and the second management function of the energy management system; and
    - cause the feeding of the power from the facility to the electrical apparatus as managed by the determined one of the electrical apparatus and the processor so as to avoid interference between the first and second management functions;
- wherein:
    - (i) the processor manages the power feeding schedule upon the energy management system having setting information of the power feeding schedule set by a user and the electrical apparatus not having the setting information of the power feeding schedule set by the user, and
    - (ii) the electrical apparatus manages the power feeding schedule upon the electrical apparatus having setting information of the power feeding schedule set by a user and the energy management system not having the setting information of the power feeding schedule set by a user.

16. The energy management system according to claim 15, wherein
- upon either (a) both of the energy management system and the electrical apparatus having the setting information, or (b) neither one of the energy management system and the electrical apparatus having the setting information:
    - (i) the electrical apparatus manages the power feeding schedule upon the first management function including a prediction function to predict a user behavior and the second management function not including the prediction function to predict the user behavior, and
    - (ii) the processor manages the power feeding schedule upon the first management function not including the prediction function to predict the user behavior and the second management function including the prediction function to predict the user behavior.

* * * * *